United States Patent
Grubb

(10) Patent No.: US 11,783,281 B2
(45) Date of Patent: Oct. 10, 2023

(54) SYSTEM AND METHODS FOR SELF-ADJUSTING ELECTRONIC RECONCILIATION OF A CONTRIBUTION AMOUNT AND DELIVERY VALUE

(71) Applicant: United Parcel Service of America, Inc., Atlanta, GA (US)

(72) Inventor: Chris Grubb, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 29 days.

(21) Appl. No.: 17/559,861

(22) Filed: Dec. 22, 2021

(65) Prior Publication Data
US 2022/0114549 A1 Apr. 14, 2022

Related U.S. Application Data

(63) Continuation of application No. 16/725,451, filed on Dec. 23, 2019, now Pat. No. 11,257,028.

(60) Provisional application No. 62/800,828, filed on Feb. 4, 2019, provisional application No. 62/789,297, filed on Jan. 7, 2019.

(51) Int. Cl.
| | |
|---|---|
| G06Q 10/08 | (2023.01) |
| G06Q 30/06 | (2023.01) |
| G06Q 10/0834 | (2023.01) |
| G06Q 30/0601 | (2023.01) |
| G06Q 10/0835 | (2023.01) |
| G06Q 40/00 | (2023.01) |
| G06Q 40/08 | (2012.01) |

(52) U.S. Cl.
CPC ... *G06Q 10/08345* (2013.01); *G06Q 10/0835* (2013.01); *G06Q 30/06* (2013.01); *G06Q 30/0601* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 8,306,975 B1 * | 11/2012 | Eldering | G06Q 50/00 707/732 |
| 8,781,903 B1 | 7/2014 | Bohen et al. | |
| 10,275,824 B2 | 4/2019 | Peterson et al. | |
| 11,257,028 B2 * | 2/2022 | Grubb | G06Q 30/0601 |
| 2013/0144715 A1 | 6/2013 | Kranzley et al. | |
| 2015/0073936 A1 | 3/2015 | Peterson et al. | |
| 2017/0048216 A1 | 2/2017 | Chow et al. | |
| 2018/0197132 A1 | 7/2018 | Nayak et al. | |

(Continued)

FOREIGN PATENT DOCUMENTS

WO 01/13261 A1 2/2001

OTHER PUBLICATIONS

Specification of U.S. Appl. No. 62/770,738, filed Nov. 21, 2018. (Year: 2018).*

(Continued)

*Primary Examiner* — Nicholas D Rosen
(74) *Attorney, Agent, or Firm* — Shook, Hardy & Bacon L.L.P.

(57) ABSTRACT

Embodiments of the present disclosure are directed to a system, methods, and computer-readable media for a self-regulating and self-adjusting reconciliation of a cumulative contribution amount and a cumulative delivery value determined for instances associated with an entity.

20 Claims, 15 Drawing Sheets

(56) References Cited

U.S. PATENT DOCUMENTS

2020/0160328 A1 5/2020 Yan
2020/0219156 A1 7/2020 Grubb

OTHER PUBLICATIONS

Li, Yan, "An Integrated Model of Third-party Agile Logistics Based on E-commerce", International Conference on Wireless Communications, Networking and Mobile Computing, WiCOM 2008, IEEE Computer Society, 2008, pp. 1-4.
Zhang, Wenzhou, "Enterprise Logistics Analysis based on Supply Chain Optimization", International Conference or Intelligent Transportation, Big Data and Smart City, ICITBS, Institute of Electrical and Electronic Engineers, Inc., 2016, pp. 357-360.

\* cited by examiner

SYSTEM AND METHODS FOR SELF-ADJUSTING ELECTRONIC RECONCILIATION OF A CONTRIBUTION AMOUNT AND DELIVERY VALUE

CROSS-REFERENCE TO RELATED APPLICATIONS

This patent application is a continuation of U.S. application Ser. No. 16/725,451, filed on 23 Dec. 2019 and entitled "System and Methods for Self-Adjusting Electronic Reconciliation of a Contribution Amount and Delivery Value", which claims the benefit of priority to U.S. Provisional App. No. 62/789,297, filed on 7 Jan. 2019, and which also claims the benefit of priority to U.S. Provisional App. No. 62/800,828, filed on 4 Feb. 2019, all of which are incorporated in their entireties by reference herein.

SUMMARY

Various embodiments of the present disclosure are directed to a system, methods, and computer-readable media for a self-regulating and self-adjusting reconciliation of a cumulative contribution amount and a cumulative delivery value for an entity.

In embodiments, a computer-implemented method is provided. In accordance with the method, a selected instance (e.g., e-commerce transaction) fulfilled by an entity is determined to correspond to a first class of a defined index having a plurality of defined classes. An instance value associated with the selected instance is determined to belong to a first tier of the index, the first tier having an instance value range. The instance value is then multiplied by a defined baseline ratio that is associated with the first class and the first tier of the defined index. In embodiments, a delivery value associated with a delivery of the instance, such as the instance fulfilled by the entity and determined to correspond to the first class, is calculated. The method calculates, in an embodiment, a cumulative contribution amount of the instance fulfilled by the entity during a predetermined period of time. In embodiments, the method further calculates a cumulative delivery value of deliveries associated with a plurality of instances during the predetermined period of time. The method then facilitates an electronic reconciliation of the cumulative contribution amount with the cumulative delivery value for the entity for the predetermined period of time.

BRIEF DESCRIPTION OF THE DRAWINGS

Figure 1:
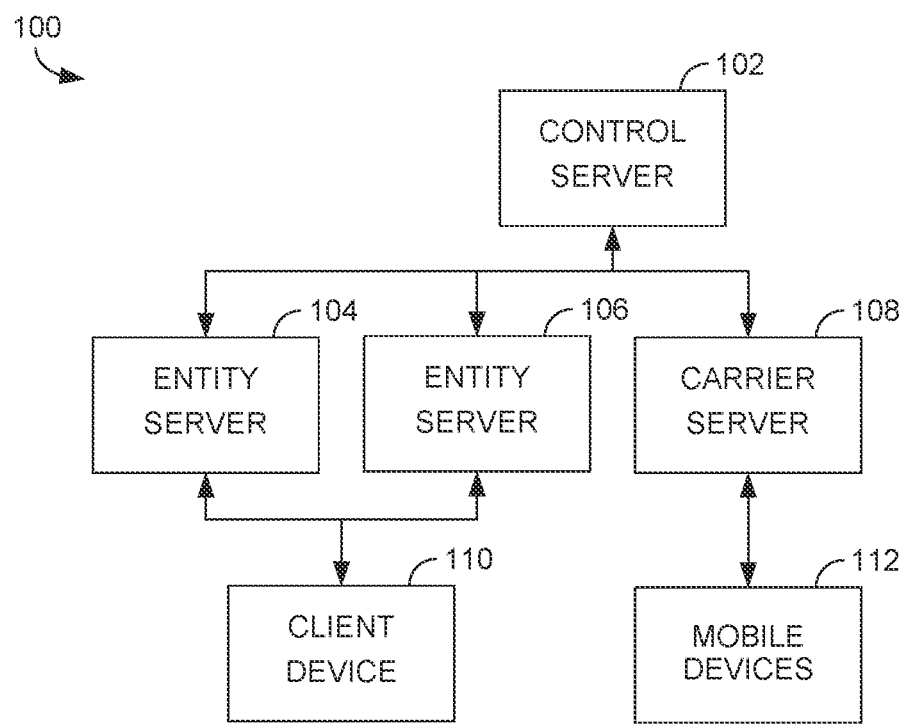
Figure 2:
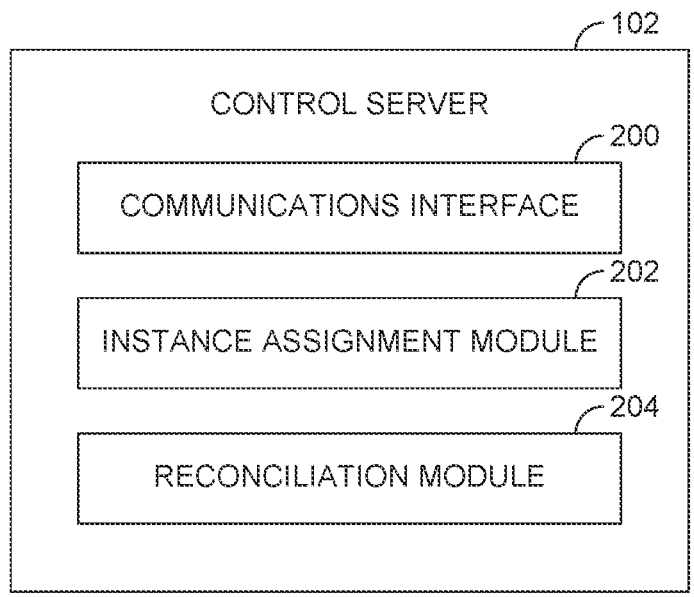
Figure 3A:
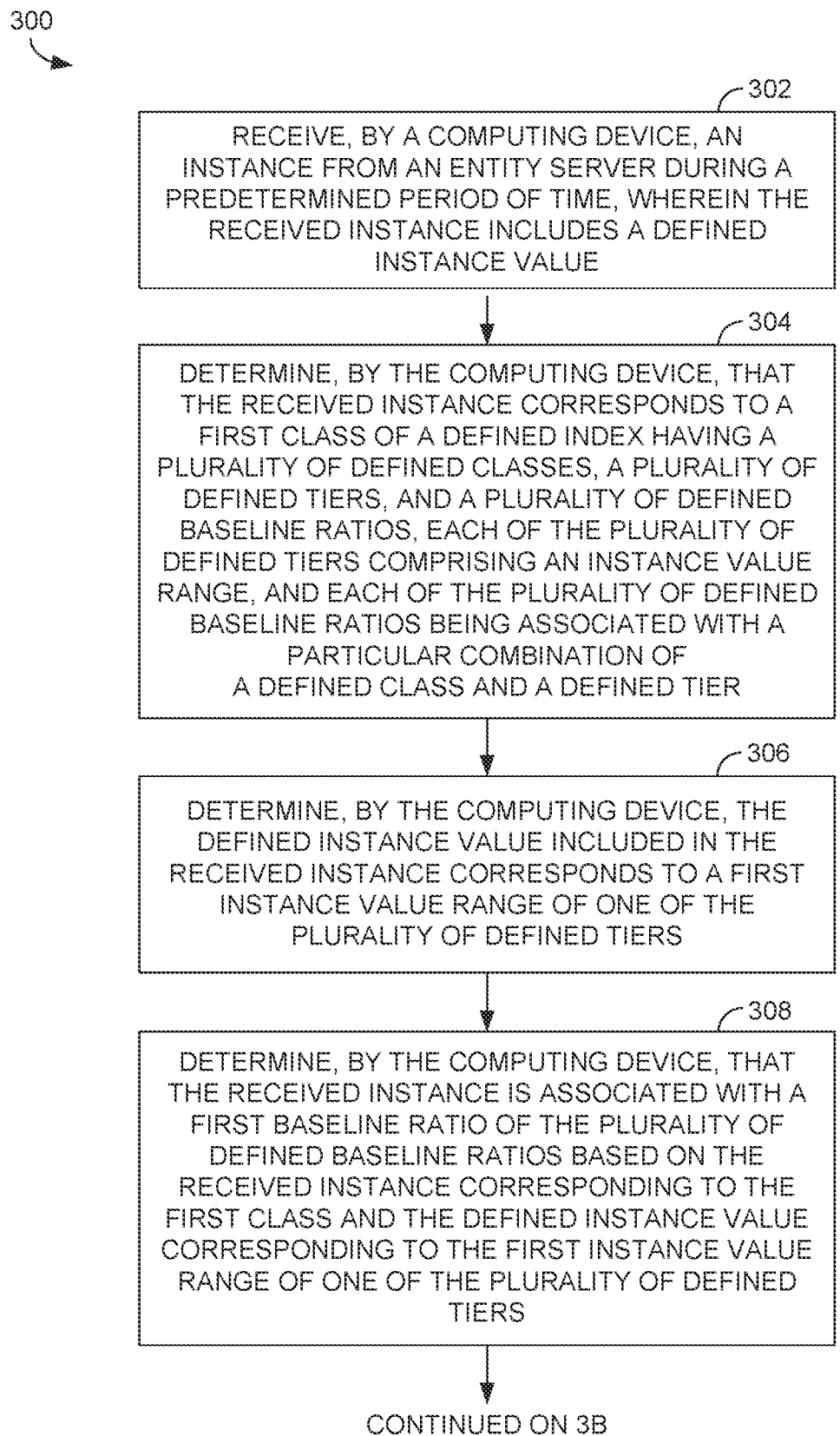
Figure 3B:
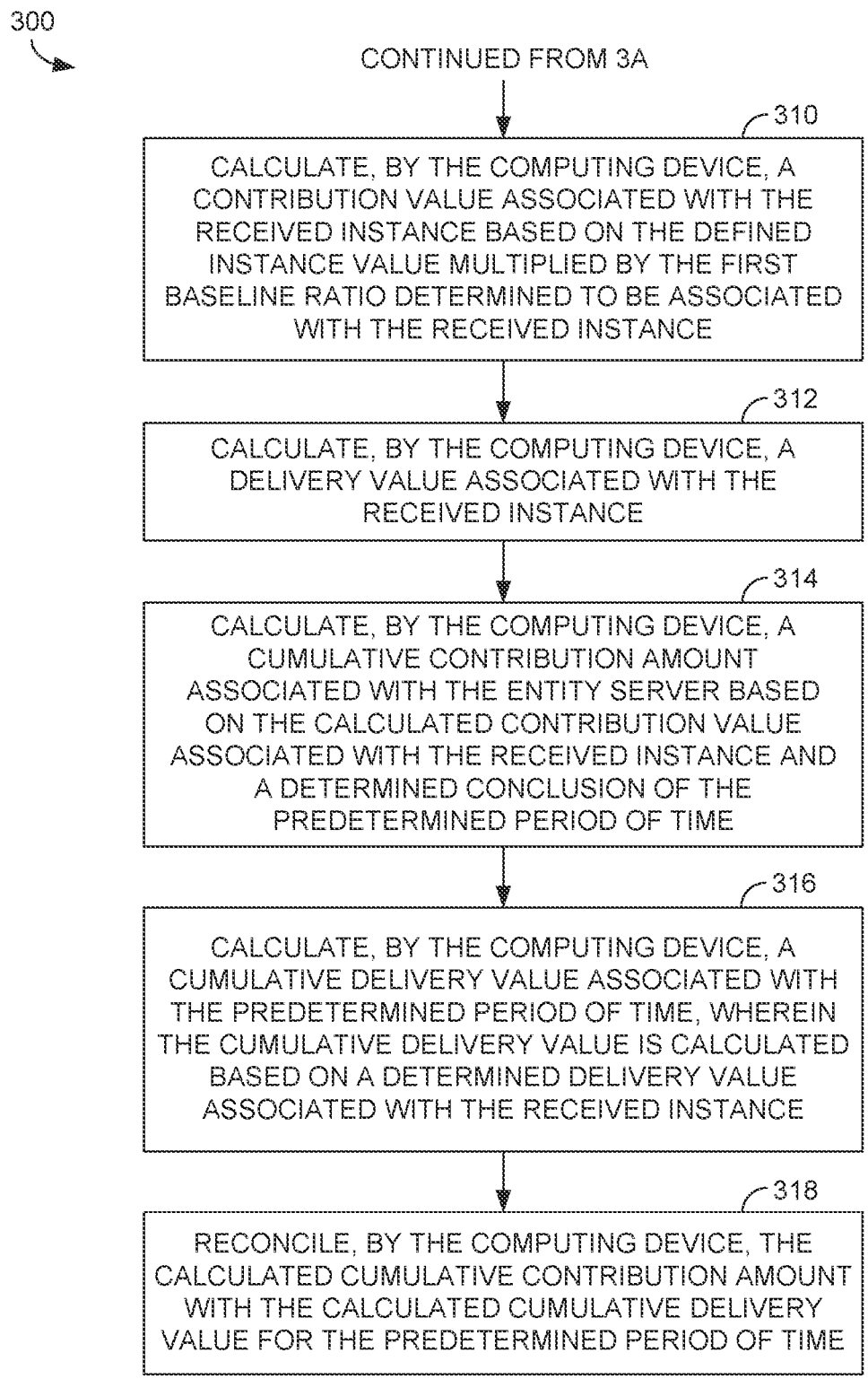
Figure 4:
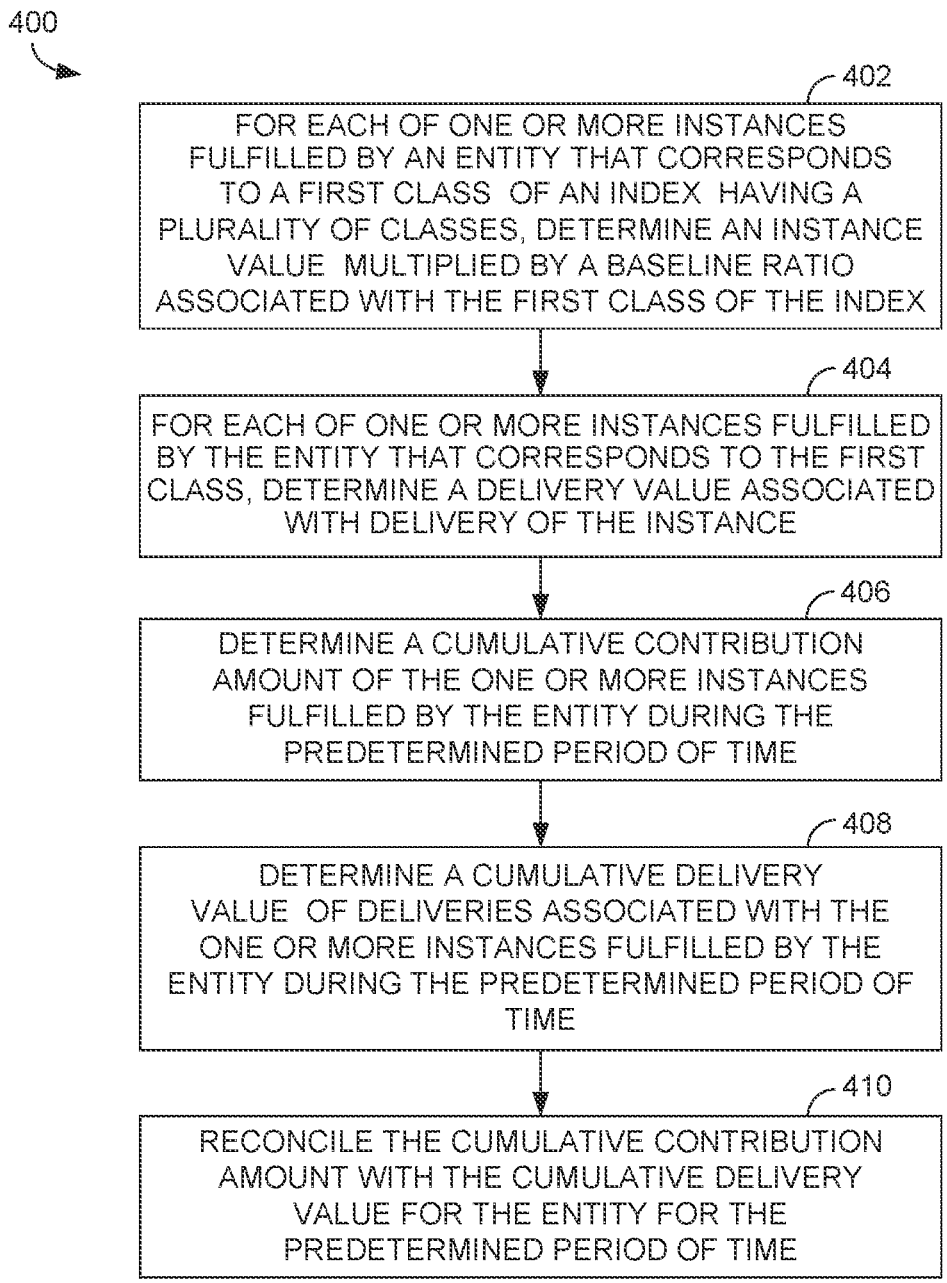
Figure 5:
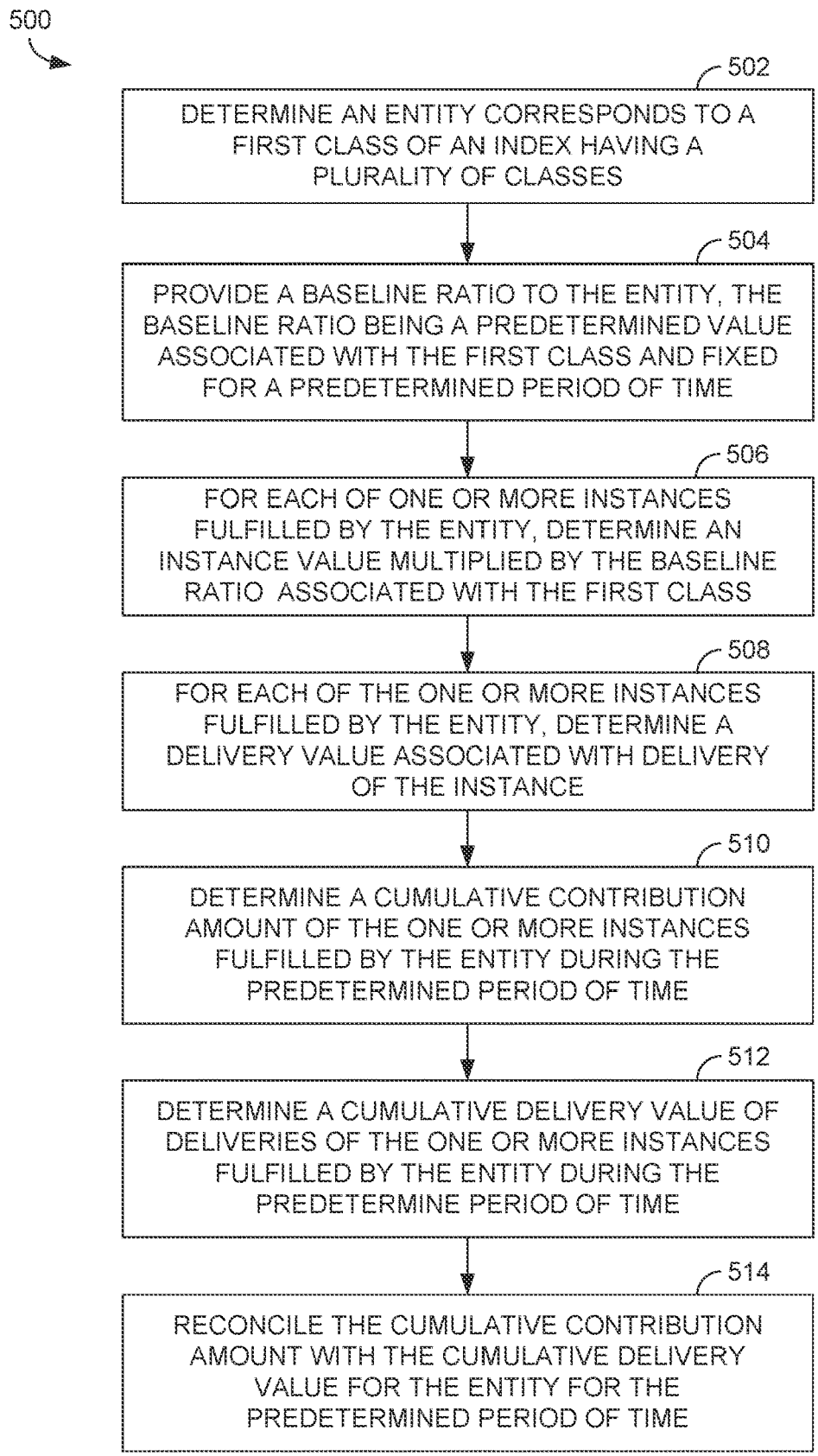
Figure 6:
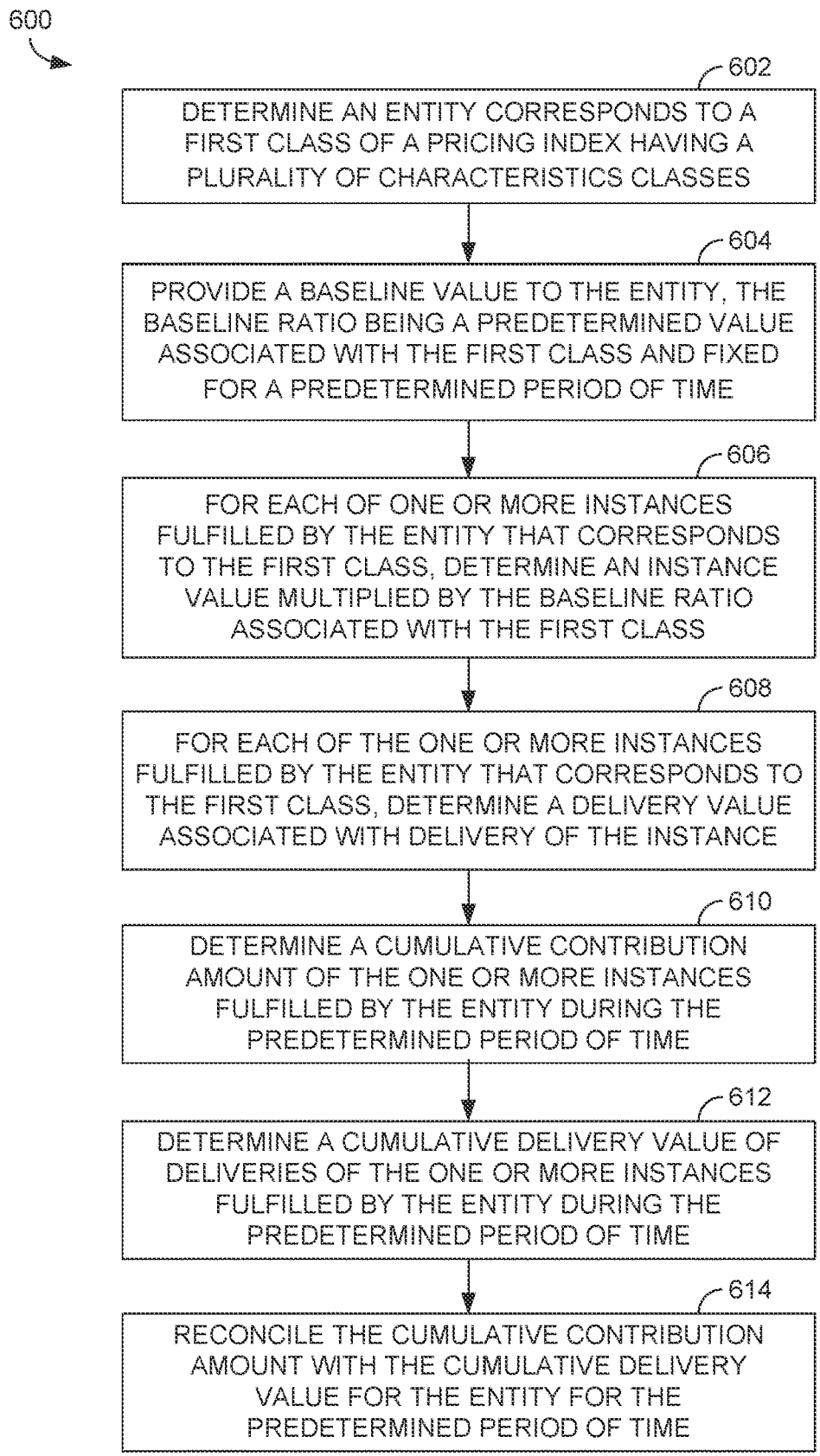
Figure 7:
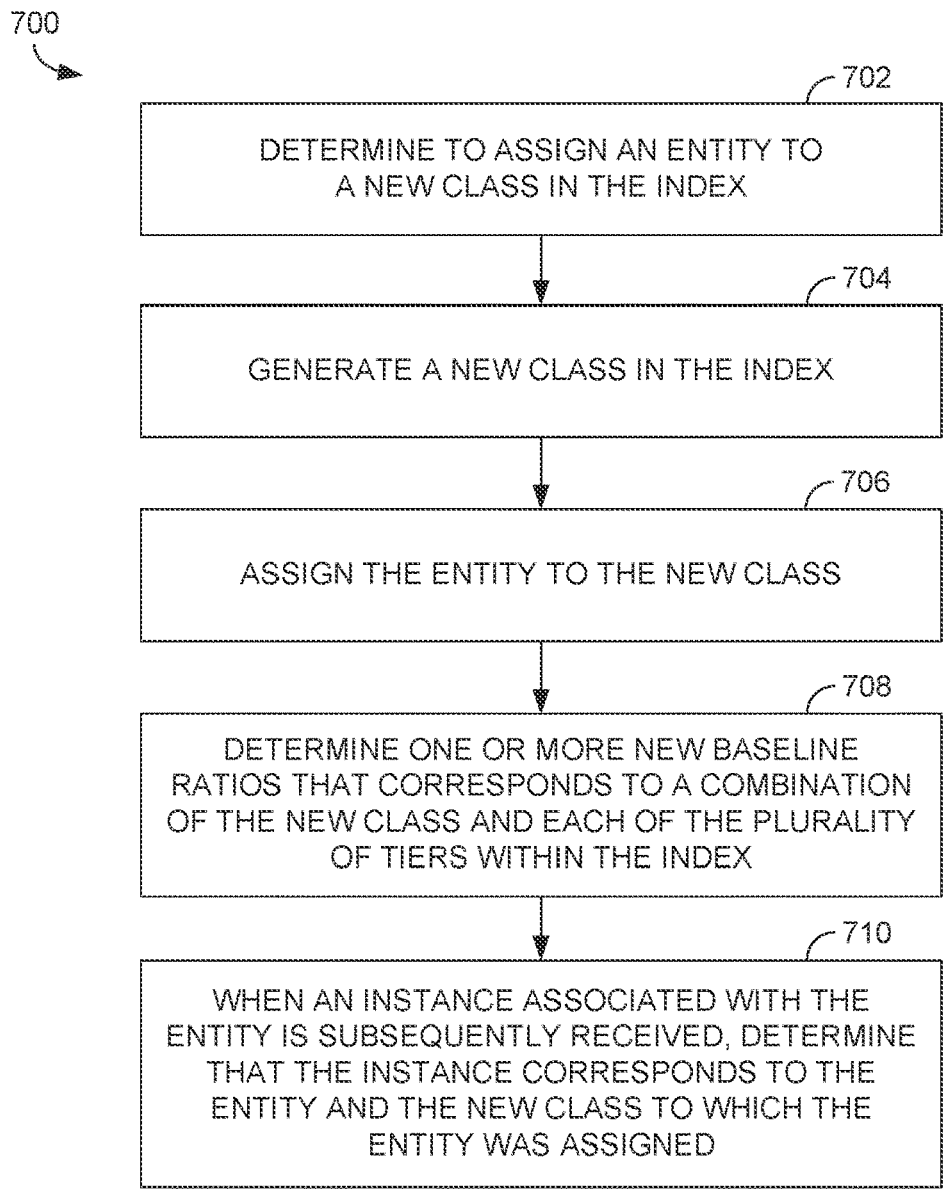
Figure 8:
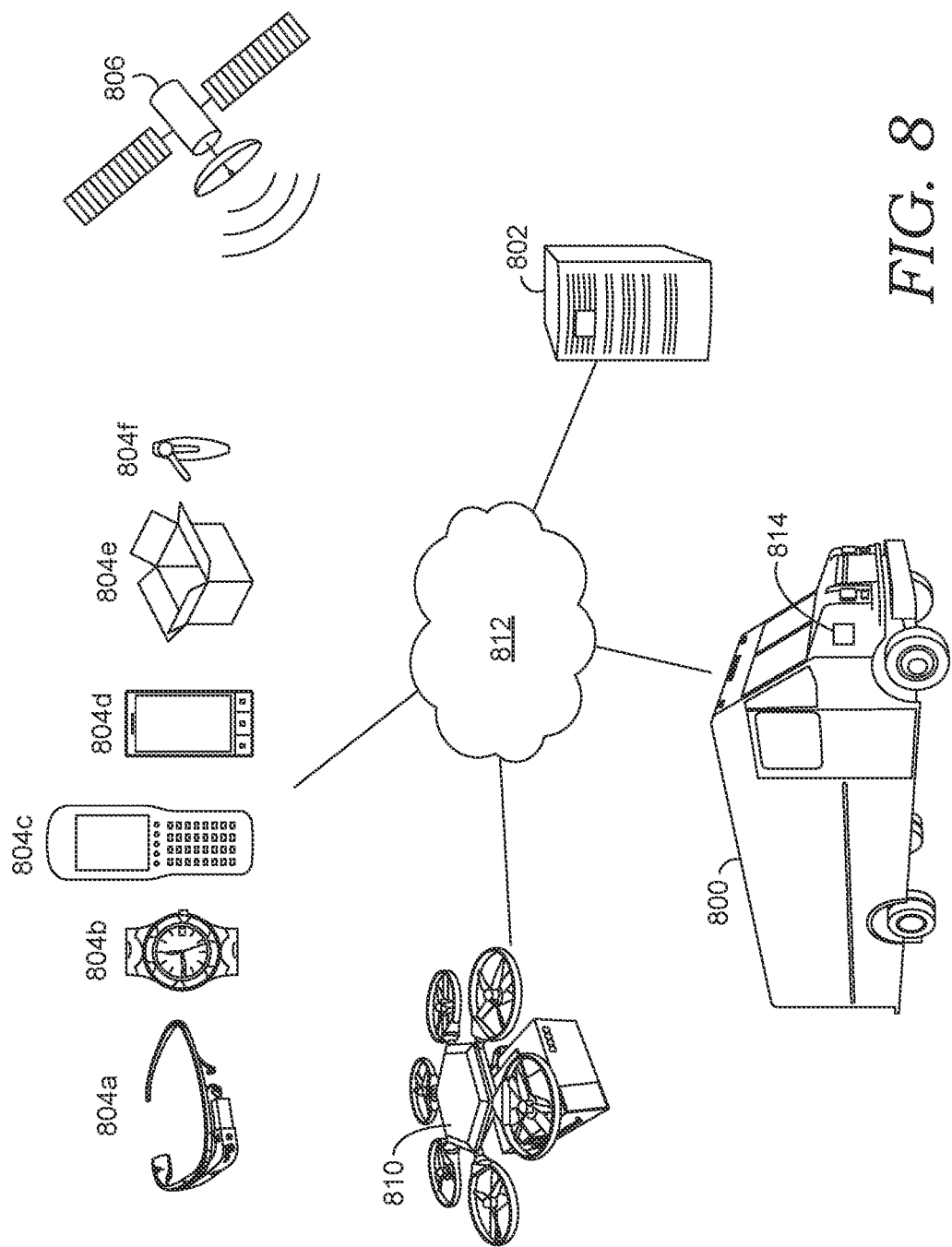
Figure 9:
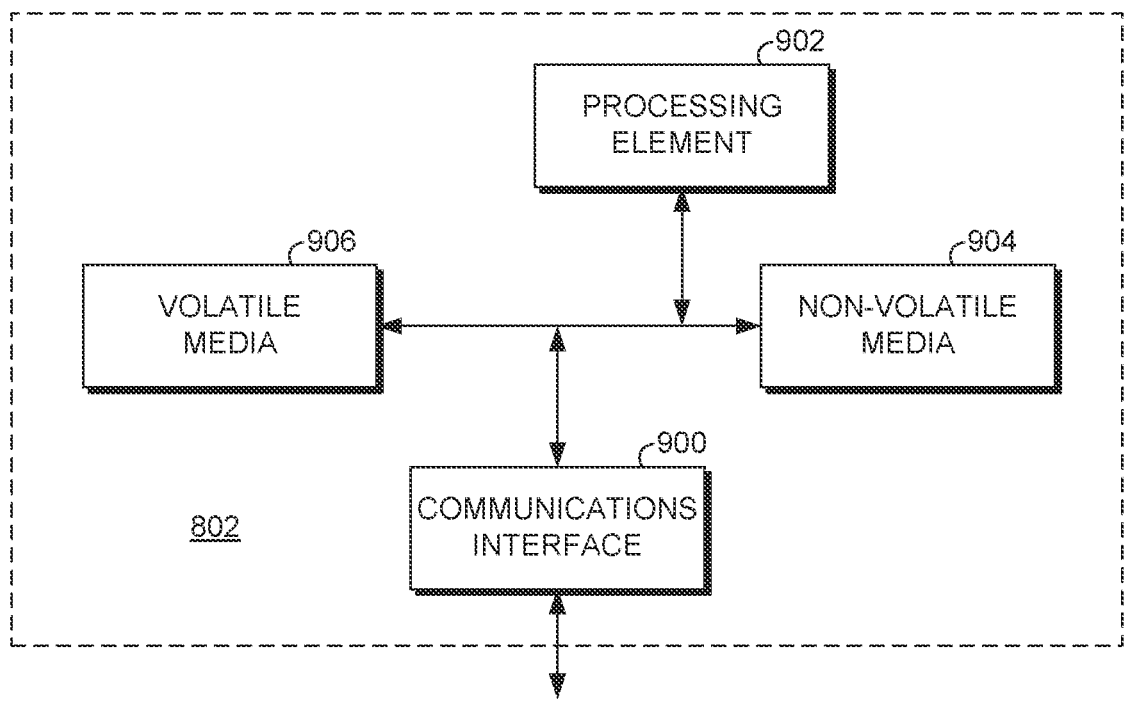
Figure 10:
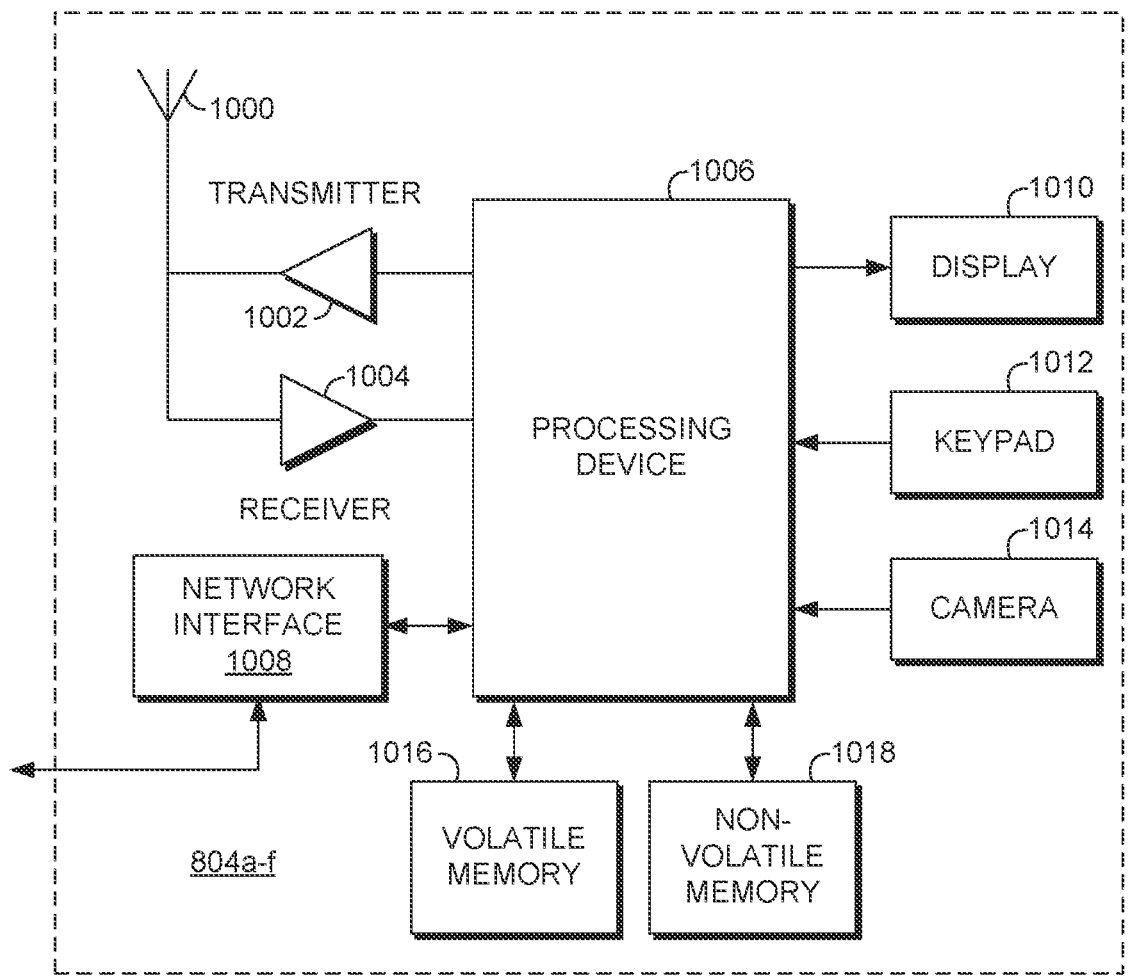
Figure 11:
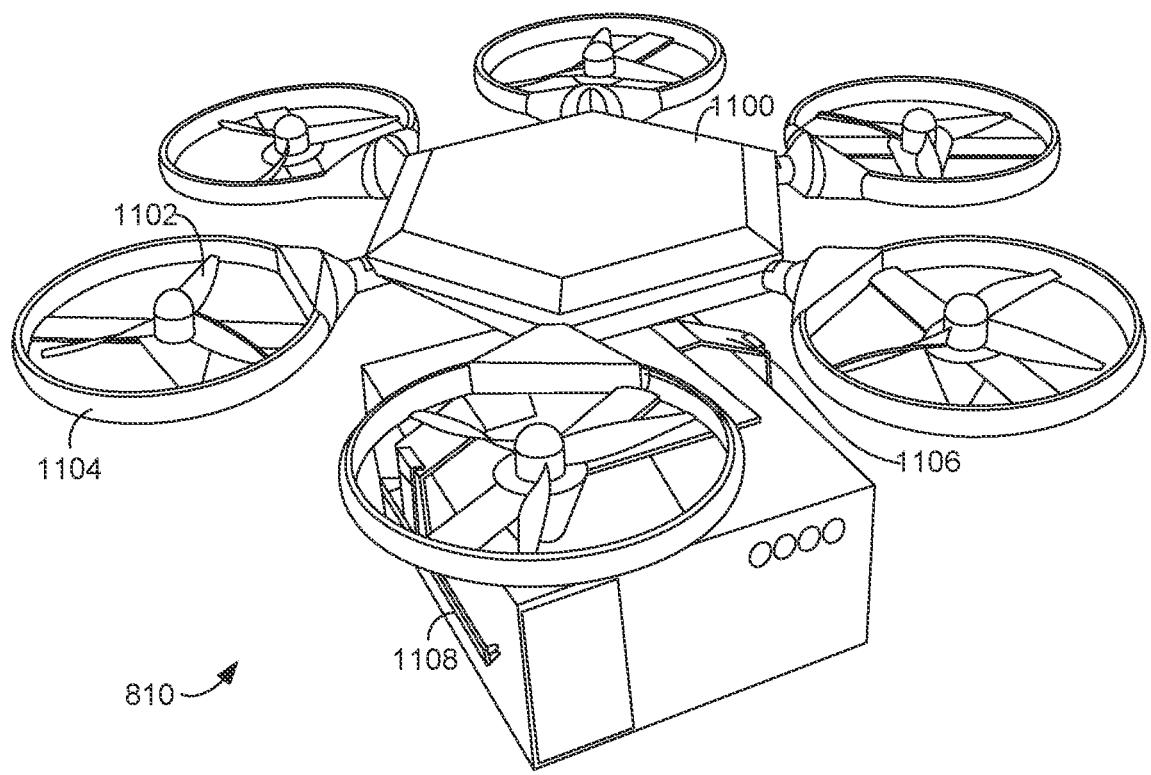
Figure 12:
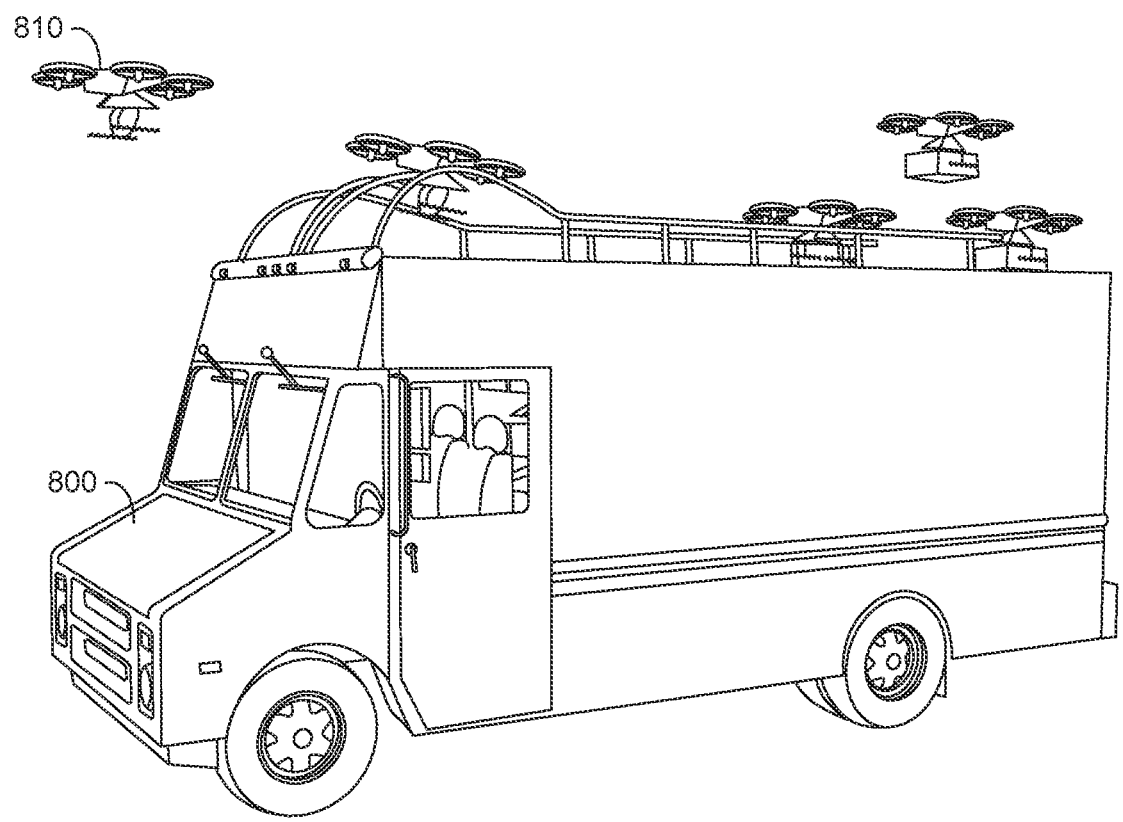
Figure 13:
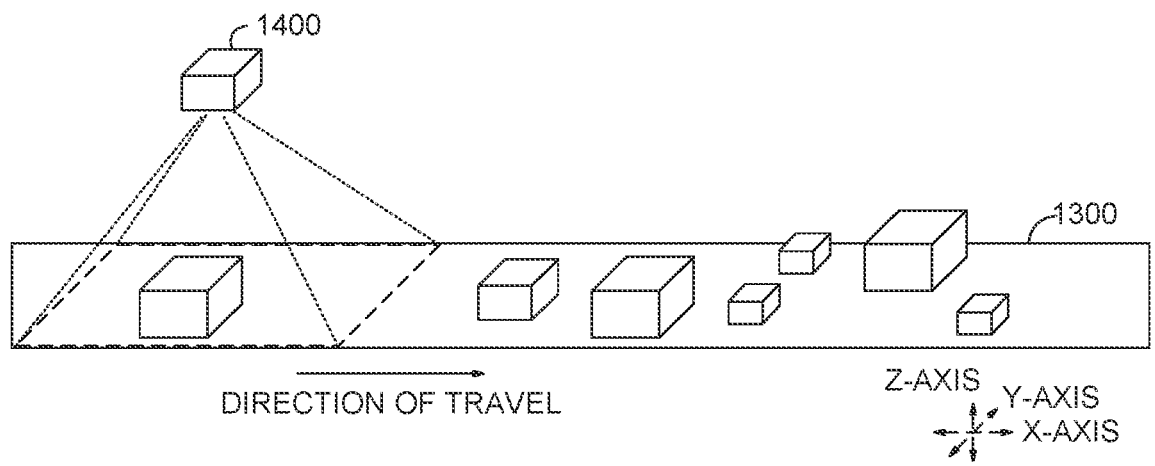
Figure 14:
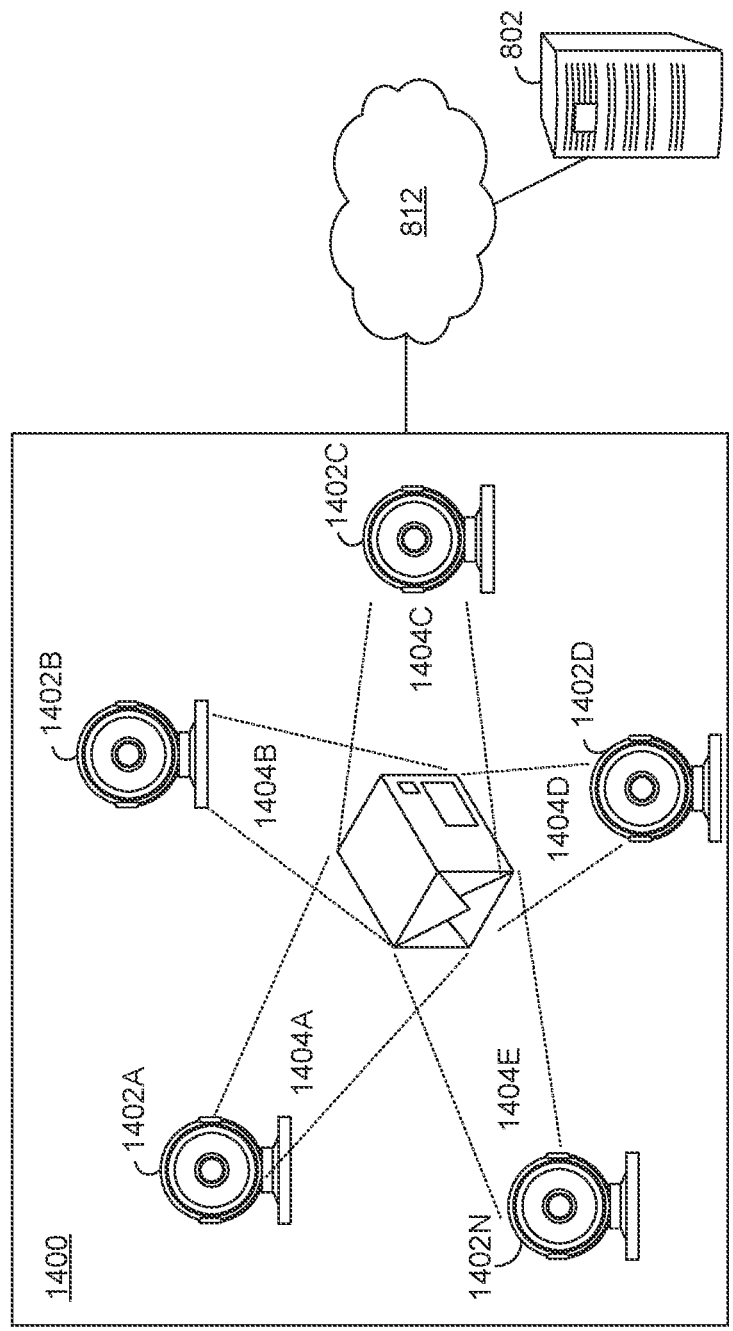

Having thus described the disclosure in general terms, reference will now be made to the accompanying drawings, which are not necessarily drawn to scale, and wherein:

FIG. 1 provides an exemplary environment in accordance with embodiment of the present disclosure;

FIG. 2 provides an exemplary server in accordance with embodiments of the present disclosure;

FIGS. 3A-B illustrate a flowchart of an exemplary computer-implemented method in accordance with embodiments of the present disclosure;

FIG. 4 illustrates a flowchart of an exemplary computer-implemented method in accordance with embodiments of the present disclosure;

FIG. 5 illustrates a flowchart of an exemplary computer-implemented method in accordance with embodiments of the present disclosure;

FIG. 6 illustrates a flowchart of an exemplary computer-implemented method in accordance with embodiments of the present disclosure;

FIG. 7 illustrates a flowchart of an exemplary computer-implemented method in accordance with embodiments of the present disclosure;

FIG. 8 provides an illustration of another exemplary environment in accordance with embodiments of the present disclosure;

FIG. 9 provides an illustrative schematic of an exemplary computing entity in accordance with an embodiment of the present disclosure;

FIG. 10 provides an illustrative schematic of an exemplary mobile computing entity in accordance with an embodiment of the present disclosure;

FIG. 11 illustrates an exemplary autonomous vehicle in accordance with an embodiment of the present disclosure;

FIG. 12 illustrates an exemplary manual vehicle in accordance with an embodiment of the present disclosure;

FIG. 13 illustrates an exemplary conveying mechanism in accordance with an embodiment of the present disclosure; and FIG. 14 illustrates an exemplary image capture system in accordance with an embodiment of the present disclosure.

DETAILED DESCRIPTION OF THE INVENTION

The present disclosure will now be described more fully hereinafter with reference to the accompanying drawings, in which some, but not all embodiments of the disclosure are shown. Indeed, the disclosure can be embodied in many different forms and should not be construed as limited to the embodiments set forth herein. Rather, these embodiments are provided so that this disclosure will satisfy applicable legal requirements. Like numbers refer to like elements throughout.

Exemplary System Operation

Various embodiments of the present disclosure improve these existing technologies in at least the following ways. Utilizing the systems and computer-implemented methods described herein, entities can be provided with increasingly accurate and predictable estimations of accruing shipping, handling, insurance, and delivery amounts while maintaining the privacy of proprietary carrier-side actual cost determinations. An index from which such estimations are determined can be dynamically updated on a periodic basis based on actual costs and predicted estimations, such that a fair distribution of costs can be automatically determined for subsequent settlements. Existing and conventional technologies fail to capture these aspects.

Beginning with FIG. 1, an exemplary environment 100 is provided. The environment 100 comprises a plurality of servers in communication with one another, directly and/or indirectly, using wired and/or wireless connections. The plurality of servers includes a control server 102, one or more entity servers 104 and 106 hosting one or more e-commerce entities, and a carrier server 108 hosting a carrier entity. The carrier server 102 can communicate with mobile devices 112, in some embodiments. The environment 100 further comprises a client device 110 in communication with the one or more entity servers 104 and 106 hosting the e-commerce entities.

At a high level, an instance is generated by the entity server 104 based on a communication (e.g., an e-commerce order for items) received from the client device 110. Although referred to as an "entity" server, it will be understood that the server can be an e-commerce server that handles (e.g., receives, facilitates, processes) transactions for any number of entities. The instance, among other instances, is communicated from the entity server 104 to the control server 102. The control server 102 selects the instance for processing and reconciliation. The control server 102 can select an instance on or after the expiration of a predetermined period of time, or alternatively, on an on-going basis when the instance is received from the entity server 104. The instance itself is associated with a value. The value can be determined by the entity corresponding to or hosted by the entity server 104 and/or by a purchaser corresponding to or hosted by the client device 110. For example, the value of the instance can comprise the retail or wholesale pricing of one or more items associated with that instance, and/or other costs and fees as determined between the entity, the purchaser, and/or the carrier entity. The value can be used to identify a defined percentage or ratio, or baseline ratio, of the total value of the items in the order used to generate the instance. The defined baseline ratio is obtained by referencing a carrier-defined index having various defined entity classes and pricing tiers. In some aspects, the classes and pricing tiers can be manually or dynamically defined. The defined baseline ratio is obtained by aligning the value of the order from which the instance was generated with a pricing tier in the defined index, and aligning the entity associated with the instance with an entity class in the defined index, wherein the alignment identifies a defined baseline ratio that is specific to the combination of the pricing tier and entity class, as further explained hereinafter.

Once selected, the control server 102 reconciles the instance by calculating the value provided (e.g., paid) by the entity as compensation for the shipping, handling, insurance, and/or delivery of items ordered in the instance relative to the value of the carrier-determined cost of the shipping, handling, insurance, and/or delivery of the items ordered in the instance. In embodiments, the value provided by the entity as compensation for the shipping, handling, insurance, and/or delivery of items ordered in the instance is referred to as the contribution amount, as discussed in detail hereinafter. The contribution amount is generally calculated by multiplying the value of the order from which the instance was generated by the defined baseline ratio obtained from the carrier-defined index (e.g., by the alignment mentioned above). The value or contribution amount provided by the entity as compensation for the shipping, handling, insurance, and/or delivery of items ordered in the instance can be collected by the carrier and/or a third party at any time, whether prior or subsequent to the actual shipping, handling, insurance, and/or delivery of items ordered in the instance. The carrier-determined cost refers to the carrier-determined pricing for the shipping, handling, insurance, and/or delivery of items ordered in the instance. The carrier-determined pricing generally exceeds the actual cost incurred by the carrier to drive a profit for the carrier. However, it is contemplated that in some instances, the pricing can match the actual cost incurred or the pricing can be lower than the actual cost incurred. Additionally, in embodiments, the value of the carrier-determined cost of the shipping, handling, insurance, and/or delivery of the items ordered in the instance is referred to as the delivery amount, as discussed in detail hereinafter. As the control server 102 reconciles the contribution amount provided by the entity and the delivery value determined by the carrier, the control server 102 can calculate a deficit or a surplus. In some embodiments, a determined deficit can be optionally "written off" or recouped by requesting additional value from the entity and a surplus can be distributed to the carrier, a third party, and/or the entity, in various embodiments. In some embodiments, the surplus can be distributed to the purchaser associated with an instance (e.g., transaction for an item) and/or the intended recipient of an item.

Once the control server 102 determines the reconciliation, the control server 102 can communicate the reconciliation information to the carrier server 108. In further embodiments, the entity server 104 can receive a communication from the control server 102 regarding a determined deficit, for example. The carrier server 108 can communicate a request for additional value to the entity server 104, or another third party, for example. In some other embodiments, a third party can receive a communication from the control server 102 regarding a determined surplus, for example, such that the surplus determined from the reconciliation can be distributed to one or more of the carrier of the carrier server 108 and/or a third party. In some instances, the distribution of surplus can be provided using fiat currency. The distribution can be facilitated utilizing electronic banking transactions, which can be automated based on the determined surplus, or facilitated through a workflow having values defined based on the determined surplus. Additionally or alternatively, the distribution of surplus can be provided, for example, by distributing (e.g., electronically generating transactions for transferring) virtual or cryptocurrency (e.g., BITCOIN™, Ethereum®, Litecoin, RIPPLE®, Dogecoin, and/or the like), in some embodiments. Similarly, the distribution of surplus utilizing such alternative methods of payment can be automated based on the determined surplus, or facilitated through a workflow having values defined based on the determined surplus.

Based on the reconciliation performed via the control server 102, the defined baseline ratios, pricing tiers, and entity classes can be dynamically modified in order to adjust for anticipated deficits and/or surpluses for subsequently performed reconciliations of later selected instances. Based on the reconciliation, the control server 102 can determine that there is a deficit instead of a surplus, and the control server 102 can change the particular baseline ratio that corresponds to the combination of class and tier, from which the deficit was created for corresponding instances, by increasing the baseline ratio, for example, to reduce the deficit for future instances evaluated in future periods of time. In another example, the control server 102 can determine that there is a surplus of revenue, and the control server 102 can change the particular baseline ratio that corresponds to the combination of class and tier, from which the surplus was generated for corresponding instances, by decreasing the baseline ratio, for example, to reduce (while maintaining at least some margin of) the surplus for future instances evaluated in future periods of time.

In accordance with embodiments described herein, references to an instance, an index, an order, a value, a baseline, an amount, a tier, a class, and the like, can be defined as an electronic data object or other electronic data structure that is defined, stored, and/or generated by a computing device.

Turning to FIG. 2, an exemplary diagram of a computing device is shown. Generally, the computing device corresponds to the control server 102. The control server 102 can comprise a communications interface 200. In embodiments, the communications interface 200 can receive an instance from entity server 104 during a predetermined period of time, wherein the received instance includes a defined instance value. The instance can be generated, for example, at the entity server 104 in response to a communication (e.g., an electronic internet-based purchase of one or more items) received from a client device 110.

The control server 102 can further comprise an instance assignment module 202. The instance assignment module 202 can access and reference a defined index. The index can comprise a plurality of defined classes, a plurality of defined tiers, and a plurality of defined baseline ratios. In some embodiments, the classes, tiers, and baseline ratios in the index can be defined by the control server 102 acting at the request of the carrier and/or carrier server 108. Generally, each of the plurality of defined tiers can comprise an instance value range. In one embodiment, the instance value ranges can correspond to a retail value or a wholesale value, for example, as defined by an entity and/or entity server 104. As such, the instance value can be defined by the entity or the purchaser, or by a negotiated agreement between the entity and the purchaser, for example. Additionally, each of the plurality of defined baseline ratios can be associated with a particular combination of a defined class and a defined tier in the defined index. As used herein, "defined" indicates that a thing is predetermined, predefined, set, static, and/or otherwise prior to the receipt of the instance, for example.

The instance assignment module 202 can determine a defined class and a defined tier to which the received instance is to be assigned, and thus, can further assign a defined baseline ratio to the instance based on the class and tier assignment, as described in detail hereinafter. As such, in an embodiment, the instance assignment module 202 can determine that the received instance corresponds to a first class of the defined index having the plurality of defined classes, the plurality of defined tiers, and the plurality of defined baseline ratios. Generally, the received instance can be determined to correspond to a first class based on entity characteristics associated with the received instance. For example, when the received instance corresponds to an e-commerce transaction between a client and an entity that sells automobile replacement parts, the entity can correspond to a particular defined class based on the entity's association with automobile replacement parts. In another example, when the received instance corresponds to an e-commerce transaction between a client and an entity that sells automobile replacement parts, the entity can correspond to a particular defined class based on the volume of the entity's consumption of carrier services for shipment of the automobile replacement parts being sold. As such, one or more classes can be specialized and defined by one or more entity characteristics or characteristics of items associated with the entity. An entity associated with one or more instances generated from orders for items having particular dimensions, weight, fragility, and/or risk (e.g., volatile materials) defined as characteristics associated with the items can be used to assign the received instance associated with the particular entity to the first class. Additionally or alternatively, delivery distance, pickup location, delivery location, speed of delivery service (e.g., overnight delivery versus ground delivery), and/or mode of delivery defined as characteristics associated with items can be used to assign the received instance to the first class.

The instance assignment module 202 can determine that the received instance is associated with a particular entity by using the data of the instance, in embodiments, to identify the entity. Further, the instance assignment module 202 can determine that the particular entity is associated with one specific class in the index, in embodiments.

In some embodiments, an entity can be associated with one of the plurality of classes, either based on an initial instance being received and/or concurrent with or prior in time, for example, when registering the entity for participation in the reconciliation program. For example, one or more entities can register with the control server 102 or "onboard" to the reconciliation program, and the one or more entities can provide information that is then used to assign each of the one or more entities to a corresponding class in the index. In one embodiment, the entity provides an average order (or instance) value. Additionally, in some embodiments, the entity provides an average order (or instance) weight. The entity can then be assigned to a class without requiring additional item type, dimensions, or sales information. In another embodiment, the entity provides an average order weight, an average order value, and an average number of orders per month at onboarding and registering. Additionally, the entity can provide a location, from which items are to originate as shipments, for example, as part of onboarding and registering. The entity can provide additional information such as, in various embodiments, one or more of a number of actual orders to be received and/or completed within a predetermined period of time (e.g., per month, per quarter, per a first quarter of a year, per a last quarter of a year, annually, bi-monthly), a predicted number of orders for a predetermined period of time, an average order value (e.g., corresponding to instance value), an average order weight, actual total order values for a predetermined period of time, a predicted total order value for a predetermined period of time, or the like. The additional information of the entity at onboarding and/or the initial instance received can include an actual weight associated with an item to be shipped for an order, for example. Additional information can specify a product type or item class that is associated with one or more orders handled by the entity. For example, whether the item is a piece of furniture, jewelry, sports equipment, grocery, home décor, or the like. The control server 102 can use part or all of the aforementioned information to assign each entity to one of the plurality of classes in the index, in embodiments.

Using the weight associated with an item corresponding to an initial instance or order for a particular entity, for example, the control server 102 can assign the particular entity to a particular class. In a further embodiment, using the weight associated with an item corresponding to an instance for a particular entity and the number of actual (e.g., historical order and/or sales data) or predicted orders to be received and/or completed within a predetermined period of time for the particular entity, the control server 102 can assign the particular entity to one of the plurality of classes. The class can be selected by the control server 102, for example, wherein the class reflects a predicted cumulative delivery value for the predetermined period of time. When an instance is received, the entity can be identified using the instance, in some embodiments, and the class is identified that is associated with the entity.

The instance assignment module 202 can further determine the defined instance value included in the received instance corresponds to a first instance value range of one of the plurality of defined tiers. When each defined tier corresponds to a specific instance value range, the instance value of the received instance can be matched to the specific instance value range of a particular defined tier. For example, when the instance value corresponds to $201.57 for the items of the order used to generate the instance, the received instance can be determined to match with or belong to a defined tier having a defined instance value range defined as values from $150.00 up to $250.00.

The instance assignment module 202 can also determine that the received instance is associated with a first baseline ratio of the plurality of defined baseline ratios based on the received instance corresponding to the first class and the defined instance value corresponding to the first instance value range of one of the plurality of defined tiers. As mentioned above, each of the plurality of defined baseline ratios can be associated with a particular combination of a defined class and a defined tier in the defined index. As such, by determining that the received instance belongs to the first class based on the characteristics of the entity of the received instance corresponding to the first class, and by further determining that the instance value of the received instance corresponds to a particular defined tier, a baseline ratio can be identified as corresponding to the combination of the first class and the particular defined tier. Said baseline ratio can thus be associated with or assigned to the received instance.

Additionally, in further embodiments, the instance assignment module 202 can automatically flag the received instance when the instance corresponds to a particular product type or item class, and when that particular product type or item class is associated with a deviation in shipment cost, relative to other instances of the same or similar instance value (e.g., the same or similar tier in the index). In some embodiments, the instance received includes a stock keeping unit (SKU) and the SKU is utilized to identify the product type or item class. For example, one or more product types or one or more item classes can be associated with, or predefined by a carrier as corresponding to, a shipment cost that is predicted to or has historically been appraised as meeting or exceeding a threshold (i.e., a deviation relative to a majority of other instances in a particular tier). Such product types or item classes correspond to items where the baseline ratio of the corresponding tier does not accurately account for the actual cost of shipment, relative to at least a majority of instances received that are similarly sorted into the same tier (i.e., that item class is predicted to cause a surplus or deficit at reconciliation using the baseline tier of the specific tier). For example, the product type or item class can correspond to items where the actual cost of shipment relative to the instance value is such that the baseline ratio of the tier for the instance value and entity combination produces or is predicted to produce a relatively large surplus or deficit at reconciliation, relative to a majority of the other instances sorted into the same tier. In one example, a particular product type or item class can be costly for the carrier to ship due to one or more of weight, bulk, or shipment origination location, relative to the corresponding instance value (purchase price for the item), or alternatively, the particular product type or item class can be relatively cheap for the carrier to ship relative to the corresponding instance value (e.g., small lightweight items of high value). The automatically flagged instances can be further sorted into a specialized tier in the index that is specific to the product type or item class. The specialized tier can have a baseline ratio that is specific to one or more particular product types or item classes.

Continuing, the control server 102 can comprise a reconciliation module 204. The reconciliation module 204 can perform the following operations based on the determinations of class, tier, and/or baseline ratio determined by the instance assignment module 202. In some embodiments, the reconciliation module 204 of the control server 102 can determine or calculate a contribution value that is associated with the received instance. The contribution value can be based on the defined instance value multiplied by the first baseline ratio determined to be associated with the received instance. As described herein, the contribution amount can correspond to a carrier-defined fixed percentage of the instance value, though the baseline ratio can be adjusted subsequently to effectuate changes to the contribution amount of one or more received instances. The contribution value, being a fixed percentage of the instance value, for example, can correspond to a value to be paid by the entity associated with the received instance and/or purchaser associated with the received instance as payment for shipping, handling, insurance, and/or delivery of one or more items in the order for which the instance was generated at the entity server 104. Alternatively, the contribution amount can be determined by and received from an e-commerce entity and/or a third party that communicates with the e-commerce entity, for example, via the entity server 104.

The reconciliation module 204 can also calculate a delivery value associated with the received instance. A delivery value can be calculated based on shipping, handling, insurance, and/or delivery data received, for example, from a carrier through the carrier server 108. In some embodiments, the communications interface 200 can obtain one or more delivery values from a carrier, for example, via the carrier server 108. In various embodiments, the delivery value can be predicted, estimated, or an actual "known" value. For example, a predicted delivery value can be determined for those instances that correspond to an order that has been placed with the entity but for which delivery is determined not yet completed by the carrier entity at the close of a predetermined period of time (e.g., an end-of-quarter) for reconciliation. For example, for an instance, items determined as being transported internationally and/or domestically by ground can be further determined as in mid-transit at the end-of-quarter reconciliation, such that a carrier-determined delivery value is estimated. In another embodiment, the delivery value can correspond to an actual delivery value, calculated by tracking one or more parcels of the items of an order throughout their handling and delivery through the carrier's delivery network. By way of non-limiting example, for an instance, items determined as being transported via expedited carrier services (e.g., overnight shipping, three-day shipping) are likely to be completed within a short time period of order placement, such that the actual carrier-determined delivery value can be known before or by the close of the predetermined period of time for reconciliation.

It will be understood that calculating the contribution value and/or the delivery value can be performed for a plurality of instances received from an e-commerce entity, for example, via the entity servers 104 and 106, for example. However, independent of the quantity of instances received, the reconciliation module 204 can calculate a cumulative contribution amount associated with the entity server 104 and/or 106 based on the calculated contribution value associated with the received instance and a determined expiration or conclusion of the predetermined period of time. For example, when a plurality of instances are received from the entity server 104 for an entity during the predetermined period of time, the reconciliation module 204 of the control server 102 can individually determine contribution amounts for each received instance, and then can be aggregated or sum all the contribution amounts together to generate a cumulative contribution amount for one entity for the instances received during the predetermined period of time. In some embodiments, the cumulative contribution amount can be calculated, for example, upon a determination of the expiration of the predetermined period of time by the control server 102.

The reconciliation module 204 can also calculate a cumulative delivery value associated with the predetermined period of time, wherein the cumulative delivery value is calculated based on a determined delivery value associated with the received instance. For example, when a plurality of instances are received from the entity server 104 for an entity during the predetermined period of time, the reconciliation module 204 of the control server 102 can individually determine delivery values for each received instance, and then can be aggregated or sum all the delivery values together to generate a cumulative delivery value for one entity for the instances received during the predetermined period of time. In some embodiments, the cumulative delivery value can be calculated, for example, based upon a determination of the expiration of the predetermined period of time by the control server 102. Subsequently, the reconciliation module 204 reconciles the calculated cumulative contribution amount with the calculated cumulative delivery value for the predetermined period of time, in some embodiments.

FIGS. 3-6 illustrate flow diagrams of exemplary methods in accordance with the embodiments discussed herein. It will be understood that each "block" or "step" in the flowcharts, and combinations of steps in the flowcharts, can be implemented by various means, such as hardware, firmware, processor, circuitry, and/or other devices associated with execution of software including one or more computer program instructions. For example, one or more of the methods described can be embodied by computer program instructions. In this regard, the computer program instructions which embody the methods can be stored by a memory of an apparatus employing an embodiment of the present invention and executed by a processor of an apparatus. As will be appreciated, any such computer program instructions can be loaded onto a computer or other programmable apparatus (e.g., hardware) to produce a machine, such that the resulting computer or other programmable apparatus implements the functions specified in the flowchart steps. These computer program instructions can also be stored in a computer-readable memory that can direct a computer or other programmable apparatus to function in a particular manner, such that the instructions stored in the computer-readable memory produce an article of manufacture, the execution of which implements the functions specified in the flowchart blocks. The computer program instructions can also be loaded onto a computer or other programmable apparatus to cause a series of operations to be performed on the computer or other programmable apparatus, in order to produce a computer-implemented process such that the instructions executed on the computer or other programmable apparatus provide operations for implementing the functions specified in the flowchart blocks.

FIGS. 3A-B depict a flowchart of an exemplary computer-implemented method 300 described in accordance with some embodiments of the present disclosure. In various embodiments, the computer-implemented method 300 can be performed using an application programming interface (API) or platform, which can interface with any of the computing devices and/or components or modules described herein. The computer-implemented method 300 can be performed by processing logic that comprises hardware (e.g., circuitry, dedicated logic, programmable logic, microcode, etc.), software (e.g., instructions run on a processor to perform hardware simulation), firmware, or a combination thereof. In some embodiments, one or more non-transitory computer-readable media store computer-executable instructions that, when executed by one or more computing devices, cause the one or more computing devices or modules thereof to perform the computer-implemented method 300. The following description is provided for exemplary purposes only.

In accordance with the computer-implemented method 300, the method receives, by a computing device, an instance from an entity server during a predetermined period of time, wherein the received instance includes a defined instance value, shown at block 302. In an embodiment, the computing device can include a module, such as communications interface 200 of FIG. 2, which can receive an instance from an entity server during a predetermined period of time, wherein the received instance includes a defined instance value. For example, based on a communication received from a client computing device, that communication specifying an e-commerce order for one or more items that are "placed" in an electronic shopping cart and purchased from the entity using an electronic payment between the purchaser and entity or a third party, an entity server can generate an instance for the order. The instance can be communicated from the entity server 104, and thus received by the control server 102, for example.

At block 304, the computer-implemented method 300 determines, by the computing device, that the received instance corresponds to a first class of a defined index having a plurality of defined classes, a plurality of defined tiers, and a plurality of defined baseline ratios, each of the plurality of defined tiers comprising an instance value range, and each of the plurality of defined baseline ratios being associated with a particular combination of a defined class and a defined tier. In an embodiment, the computing device can include a module, such as instance assignment module 202 of FIG. 2, which determines that the received instance corresponds to a first class of a defined index having a plurality of defined classes, a plurality of defined tiers, and a plurality of defined baseline ratios. In some embodiments, the instance can be determined to belong to a first class based on the entity corresponding to the instance and order. In one example, the entity can be previously registered with a platform or API, wherein the entity has been previously associated with the first class based on a characteristic of the entity, the entity's items, and/or the entity's carrier-specific consumption. In another example, the entity can be determined to be associated with the first class based on the received instance, or based on one or more instances received within a specific predetermined period of time.

At block 306, the computer-implemented method 300 determines, by the computing device, the defined instance value included in the received instance corresponds to a first instance value range of one of the plurality of defined tiers. Generally, the instance value can be determined based on a value assigned to the order from which the instance was generated. For example, when the electronic shopping cart of the purchaser as a whole is assigned a value of $85.67, the instance generated can comprise the instance value of at least $85.67. Based on the instance value, the defined instance value tiers in the index can include a particular tier having an instance value range of $50.00 up to $100.00, for example. As such, the computer-implemented method 300 can determine, in this example, that the defined instance value corresponds to this particular instance value range, and thus, to said particular tier in the index. In an embodiment, the computing device can include a module, such as instance assignment module 202 of FIG. 2, which determines the defined instance value included in the received instance corresponds to a first instance value range of one of the plurality of defined tiers.

At block 308, the computer-implemented method 300 determines, by the computing device, that the received instance is associated with a first baseline ratio of the plurality of defined baseline ratios based on the received instance corresponding to the first class and the defined instance value corresponding to the first instance value range of one of the plurality of defined tiers. In an embodiment, the computing device can include a module, such as instance assignment module 202 of FIG. 2, that determines that the received instance is associated with a first baseline ratio of the plurality of defined baseline ratios based on the received instance corresponding to the first class and the defined instance value corresponding to the first instance value range of one of the plurality of defined tiers. Using the index, a baseline ratio or percentage is determined that corresponds to both the determined class of the instance and the determined tier of the instance. For example, for entities that correspond to the first class conducting instances having values within the first instance value tier of the instance value range of $50.00 up to $100.00, the baseline ratio of 4.95% can be assigned to this combination in the index. As such, in the example, the baseline ratio is determined for the received instance.

At block 310, the computer-implemented method 300 calculates, by the computing device, a contribution value associated with the received instance based on the defined instance value multiplied by the first baseline ratio determined to be associated with the received instance. In an embodiment, the computing device can include a module, such as reconciliation module 204 of FIG. 2, that calculates a contribution value associated with the received instance based on the defined instance value multiplied by the first baseline ratio determined to be associated with the received instance. Additionally, at block 312, the computer-implemented method 300 calculates, by the computing device, a delivery value associated with the received instance. In an embodiment, the computing device can include a module, such as reconciliation module 204 of FIG. 2, which calculates a delivery value associated with the received instance. The delivery value associated with the received instance can be determined by predicting, estimating, and/or tracking (e.g., based on near real-time information as items from the order that generated the instance travel through a carrier's shipping network after hand-off from the entity for delivery to the purchaser or recipient) the cost incurred for shipping, handling, insuring, and/or delivery of the items ordered from the entity via the electronic shopping cart, as corresponding to an order from which the received instance was generated. Additionally or alternatively, the delivery value associated with the received instance can be determined by automatically predicting and/or estimating a probability that an item can be returned, wherein the probability of an item being returned is calculated based on the purchaser, the entity, a class, an instance value, and/or a commodity type of the item. In accordance with various embodiments, the foregoing characteristics can be defined as variables (e.g., values) associated with the item or a unique identifier associated with the item.

It will be understood that calculating the contribution value and/or the delivery value can be performed for a plurality of instances received. However, independent of the quantity of instances received, at block 314, the computer-implemented method 300 calculates, by the computing device, a cumulative contribution amount associated with the entity server based on the calculated contribution value associated with the received instance and a determined conclusion of the predetermined period of time. In an embodiment, the computing device can include a module, such as reconciliation module 204 of FIG. 2, which calculates a cumulative contribution amount associated with the entity server based on the calculated contribution value associated with the received instance and a determined conclusion of the predetermined period of time. At block 316, the computer-implemented method 300 calculates, by the computing device, a calculated cumulative delivery value associated with the predetermined period of time, wherein the cumulative delivery value is calculated based on a determined delivery value associated with the received instance. In an embodiment, the computing device can include a module, such as reconciliation module 204 of FIG. 2, which calculates a calculated cumulative delivery value associated with the predetermined period of time.

At block 318, the computer-implemented method 300 reconciles, by the computing device, the calculated cumulative contribution amount with the calculated cumulative delivery value for the predetermined period of time. In an embodiment, the computing device can include a module, such as reconciliation module 204 of FIG. 2, which reconciles the calculated cumulative contribution amount with the calculated cumulative delivery value for the predetermined period of time. For example, the computer-implemented method 300 determines a difference between the calculated cumulative contribution amount and the calculated cumulative delivery value, in order to determine whether the instance generated a surplus of revenue for the carrier, or a deficit of cost for the carrier. Based on the reconciliation, the computer-implemented method 300 can modify the defined index, including the classes, tiers, and/or baseline ratios in order to effectuate changes in the handling of subsequently received instances from the entity and/or other entities, as described hereinafter.

For example, when the difference between the calculated cumulative contribution amount and the calculated cumulative delivery value is such that the instance generated a surplus of revenue for the carrier, the computer-implemented method 300 can modify the defined index by decreasing a baseline ratio that corresponds to a particular combination of one of the plurality of classes and one of the plurality of tiers. In some embodiments, the baseline ratio can be decreased by a defined percentage or value within the index, thus redefining the baseline ratio for subsequent instances. As such, when the surplus of revenue is determined to meet or exceed a predefined threshold value (e.g., exceeds by 4% and 10%), the index can be updated by decreasing the baseline ratio that corresponds to the combination of the first class of the plurality of classes and the tier that corresponds to the first instance value range. In one embodiment, the baseline ratio is decreased by no more than 0.5%, 1%, or 5% for any one predetermined period of time. Then, the updated index can be used for future instance(s) evaluated during a subsequent period of time, wherein the decreased baseline ratio is predicted to bring a cumulative contribution amount closer in value to the cumulative delivery value for that subsequent predetermined period of time, in some embodiments. As such, the updated index is predicted to reduce the surplus of revenue based on the decreased baseline ratio for the particular combination of a class and a tier, in embodiments. In one example, the baseline ratio is decreased by an amount that is predicted to place the cumulative contribution amount within a predefined percentage, range, and/or margin of the cumulative delivery value.

In another example, when the difference between the calculated cumulative contribution amount and the calculated cumulative delivery value is such that the instance generated a deficit of cost for the carrier (e.g., deficit meets or exceeds 1% to 10%), the computer-implemented method 300 can modify the defined index by increasing a baseline ratio that corresponds to a particular combination of one of the plurality of classes and one of the plurality of tiers. Then, the updated index can be used for future instance(s) evaluated during a subsequent period of time, wherein the increased baseline ratio is predicted to bring a cumulative contribution amount closer in value to the cumulative delivery value for the subsequent predetermined period of time, in some embodiments. As such, the updated index is predicted to reduce the deficit of cost and/or generate a surplus of revenue for the carrier based on the increased baseline ratio for the particular combination of a class and a tier, in embodiments. In one example, the baseline ratio is increased by an amount that is predicted to place the cumulative contribution amount within a predefined percentage, range, and/or margin of the cumulative delivery value.

Turning now to FIG. 4, a flowchart of an exemplary method is described in accordance with an embodiment of the present disclosure. The method 400 can be performed by processing logic that comprises hardware (e.g., circuitry, dedicated logic, programmable logic, microcode, etc.), software (e.g., instructions run on a processor to perform hardware simulation), firmware, or a combination thereof. In some embodiments, one or more non-transitory computer-readable media store computer-executable instructions that, when executed by one or more computing devices, cause the one or more computing devices to perform the method 400. In some embodiments, the method 400 is performed using a computing device, such as can comprise the control server 102 shown in FIGS. 1 and 2. The following description is provided for exemplary purposes only.

At block 402, the method 400 comprises determining an instance value multiplied by a baseline ratio associated with the first class of the index. Multiplying the instance value by the baseline ratio produces a contribution amount that can be remitted from an entity for the shipping, handling, insurance, and/or delivery of one or more item(s) that are the subject of an instance corresponding to the instance value. In an embodiment, the method 400 determines, by a computing device, an instance value multiplied by a baseline ratio associated with the first class of the index. In such an embodiment, the computing device can include a module, such as the instance assignment module 202 and/or the reconciliation module 204 of FIG. 2, which determines an instance value multiplied by a baseline ratio associated with the first class of the index. As explained further below, the instance value multiplied by the baseline ratio can be determined for each of one or more instances fulfilled by an entity, the entity corresponding to a first class of an index, the index having a plurality of classes including the first class. Generally, an entity refers to an entity having a web-based presence for conducting e-commerce. Exemplary entities include a retail business, a wholesale business, a seller, a merchant, a vendor, and/or a website or application user conducting an auction, resale, and/or consignment. The entity can also be a consumer of carrier services, in an embodiment. Carrier services include shipping, handling, insurance, and/or transport of items which are the subject of an instance and which are to be transported by the carrier for delivery to a recipient, for example. E-commerce generally refers to conducting retail and/or wholesale instances involving the sale of items or services provided by the entity. As used herein, "instance" and "transaction" are used interchangeably.

Generally, an entity can be assigned a class within an index, the index comprising a plurality of classes and a plurality of tiers. In some embodiments, the index can be a structured schedule that is structured as a table of one or more entity classes and one or more pricing tiers. The tiers can be customized for each class, in some embodiments. In other embodiments, the tiers are consistent across the plurality of classes. The index can provide a relationship between classes and pricing tiers, such that one or more classes are associated with one or more particular pricing tiers and some tiers are associated with one or more classes. A class refers to a group, wherein the group can be defined using characteristics of one or more of: an entity, an item, item combinations, instance(s), recipients of an item, purchasers of an item, carrier services consumed by an entity, and/or carrier services that are specific to an item and/or entity, for example.

The method 400 can determine that the entity corresponds to a first class of the index based on the characteristics associated with the entity, associated with items of the entity, and/or associated with instances of said entity, in some embodiments. The index can comprise a plurality of classes, each class being defined by one or more common, shared, or related characteristics. The method 400 can determine that the entity corresponds to a first class by determining one or more of an average parcel volume for the entity, an average delivery zone for items provided by the entity, an overall delivery density associated with the entity, or a seasonal delivery density associated with the entity. In a further embodiment, the method 400 can determine that the entity corresponds to a first class of the index having a plurality of characteristic classes by determining an average parcel weight associated with the entity, the items of the entity, and/or instances associated with the entity. In some instances, the average parcel weight characteristics can be determined by a carrier, as opposed to the entity itself. Generally, the characteristics of the entity, instances, items, and/or carrier services associated with the items and/or instances can be electronically encoded as metadata, tags, and/or tokens, in an embodiment. In some embodiments, characteristics of parcels for item(s) of an instance can be obtained based on information and data gathered, generated, or otherwise received via an autonomous vehicle, a manual vehicle, a conveying mechanism, and/or an image capture system, as discussed later regarding FIGS. 9-13. Additionally or alternatively, such characteristics can be encoded and exchanged using a blockchain to maintain a decentralized and immutable electronic ledger of instances, entities, carrier services, and/or characteristics. In some embodiments, the method 400 generates the index and formulates classes and tiers based on historical instance information and historical delivery information, whether stored in a database or a blockchain, for example.

With regard to the index, a tier can be defined by value(s) for sorting or categorizing instances. For example, a tier can correspond to one or more value(s) in any denomination or currency, including virtual or cryptocurrency. Each tier can define one or more of an instance value, a range of instance values defined by a lower value limit and an upper value limit, an instance value threshold, an average instance value, a mean instance value, and/or a mode instance value. As such, instances can be sorted into one or more tiers based on the value corresponding to the instance. In an embodiment, "instance value" refers to a purchase price or other valuation of one or more items that are the subject of the particular instance between the entity and a recipient or purchaser, wherein the instance value can be a price or valuation that can be agreed upon by the purchaser and the entity. As used herein, "recipient" and "purchaser" of item(s) are used interchangeable for simplicity but it will be apparent from this disclosure that in some embodiments, the recipient and the purchaser of item(s) are not the same person, individual, or entity.

Using the index, each instance can be assigned a baseline ratio based on the instance value relative to the tiers and the entity relative to the classes, for the instance at issue. A baseline ratio can be a predetermined ratio or percentage, in some embodiments. Generally, a specific baseline ratio can be defined for each combination of class and tier within the index. For example, a first instance having an instance value of n currency and being conducted with entity A can be assigned baseline ratio x, by assigning the first instance into a first tier that includes the instance value n currency, and further assigning the first instance to class 1 based on the characteristics of entity A corresponding to the shared or related characteristics of class 1.

To illustrate the example, a first instance corresponding to purchaser Joe's electronic shopping cart containing a plurality of items to be purchased from the entity Bob's Fish & Tackle has an instance value of $127.29, wherein the instance value can be the total summed value of all the items within Joe's electronic shopping cart (e.g., retail or wholesale price of each item can be set by Bob's Fish & Tackle). In this example, the instance value $127.29 can correspond to a second tier in the index and Bob's Fish & Tackle can be assigned or otherwise belong to entity class A, based on one or more of characteristics such as annual sales revenue, sales volume, carrier services purchases quarterly, or the like of Bob's Fish & Tackle, for example. As such, using the instance value and the entity's class to reference the index, the exemplary instance can be assigned the baseline ratio x (e.g., 2.7%) as predefined in the index for the alignment of the pricing tier and entity class. By aligning each instance with a tier that includes the corresponding instance value and with a class for the entity associated with that instance, a baseline ratio can be determined for the instance at issue. The baseline ratio can be determined for each and every instance occurring for an entity, across a plurality of entities, in embodiments. As such, for example, the method 400 locates a baseline ratio and multiplies the instance value by the baseline ratio, as discussed regarding block 402 of the method 400. Multiplying the instance value by the baseline ratio can be used to generate a contribution amount. The contribution amount can comprise a value to be remitted from the entity, generally, as a value corresponding to the anticipated cost of shipping, handling, insurance, and/or delivery of the item(s) that are the subject of the instance. The method 400 can perform the determination of block 402 for each and every instance of an entity, across a plurality of entities. Said determination can be made in an on-going manner, as instances occur and/or are fulfilled by the entity. Alternatively, said determination can be performed in batches at various time increments within the predetermined period of time (e.g., every 24 hours determinations are made for all instances of the entity that occurred within the 24 hour period of time). Further, for each entity, the instances can be recorded and the contribution amounts can be aggregated per entity for all instances occurring within a predetermined period of time. The instance values and/or contribution amounts can be encoded and exchanged using a blockchain to maintain a decentralized and immutable electronic ledger of the instances, entities, carrier services, and/or characteristics associated therewith, as previously described.

Continuing to block 404, the method 400 comprises, for each of one or more instances fulfilled by the entity that corresponds to the first class, determining a delivery value associated with delivery of the instance. Herein, "value" and "amount" are used interchangeably. A delivery value can be determined by a carrier, in some embodiments. The delivery value, in embodiments, comprises a value and/or cost of the shipping, handling, insurance, and/or delivery of the item(s) of the particular instance. The delivery value can comprise the value or cost as incurred by the carrier (e.g., actual cost incurred without a price markup), or the delivery value can comprise the value or cost for which the entity can be responsible (e.g., cost with a price markup). Generally, the delivery value may not be the same as the contribution amount remitted from the entity for the shipping, handling, insurance, and/or delivery of the item(s) that are the subject of the instance. The delivery value can be determined for each of one or more instances fulfilled by an entity, across a plurality of entities, in some embodiments. The delivery value can be encoded and exchanged using a blockchain to maintain a decentralized and immutable electronic ledger of the instances, entities, carrier services, and/or characteristics. In some embodiments, characteristics of parcels for item(s) of an instance are obtained based on information and data gathered, generated, or otherwise received via an autonomous vehicle, a manual vehicle, a conveying mechanism, and/or an image capture system, as discussed later regarding FIGS. 9-13.

At block 406, the method 400 comprises determining a cumulative contribution amount of the one or more instances fulfilled by the entity during the predetermined period of time. In an embodiment, the method 400 determines a cumulative contribution amount of the one or more instances fulfilled by the entity during the predetermined period of time via a computing device. In such an embodiment, the computing device can include a module, such as the instance assignment module 202 and/or the reconciliation module 204 of FIG. 2, which determines a cumulative contribution amount of the one or more instances fulfilled by the entity during the predetermined period of time. The cumulative contribution amount can be specific to one entity, in an embodiment, thus representing the contribution amounts for all instances fulfilled by that one entity within the predetermined period of time. In another embodiment, the cumulative contribution amount can represent contribution amounts for all instances fulfilled by a plurality of entities with one class in the index. In yet another embodiment, the cumulative contribution amount can be a summation of contribution amounts for all instances within a particular tier of the index as fulfilled by one entity. As such, in various embodiments, the cumulative contribution amount can be specific to contribution amounts for an entity, a tier, a class, or a combination thereof.

At block 408, the method 400 comprises determining a cumulative delivery value of deliveries associated with the one or more instances fulfilled by the entity during the predetermined period of time. In an embodiment, the method 400 determines the cumulative delivery value of deliveries associated with the one or more instances fulfilled by the entity during the predetermined period of time, via a computing device. In such an embodiment, the computing device can include a module, such as the instance assignment module 202 and/or the reconciliation module 204 of FIG. 2, which cumulative delivery value of deliveries associated with the one or more instances fulfilled by the entity during the predetermined period of time. The cumulative delivery value can be specific to one entity, in an embodiment, thus representing the valuation (e.g., actual cost to carrier and/or carrier-determined charges to the entity) of shipping, handling, insurance, and/or delivery of all items by the carrier, as corresponding to all instances fulfilled by that one entity within the predetermined period of time. In another embodiment, the cumulative delivery value can represent the valuation (e.g., actual cost to carrier and/or carrier-determined charges to the entity) of shipping, handling, insurance, and/or delivery of all items by the carrier, for the instances fulfilled for a plurality of entities with one class in the index. In yet another embodiment, the cumulative delivery value can be a summation of valuation (e.g., actual cost to carrier and/or carrier-determined charges to the entity) for the shipping, handling, insurance, and/or delivery of all items by the carrier for all instances within a particular tier of the index as fulfilled by one entity during the predetermined period of time. As such, in various embodiments, the cumulative delivery value can be specific to an entity, a tier, a class, or a combination thereof.

Continuing, at block 410, the method 400 comprises reconciling the cumulative contribution amount with the cumulative delivery value for the entity for the predetermined period of time. Reconciliation can be automatically performed via one or more processors on, or subsequent to, the expiration of the predetermined period of time. As such, the reconciliation-based adjustments discussed hereinafter can be automatically implemented via one or more processors such that the method 400 can be self-regulating and autonomous, in embodiments. In an embodiment, the method 400 reconciles, via a computing device, the cumulative contribution amount with the cumulative delivery value for the entity for the predetermined period of time. In such an embodiment, the computing device can include a module, such as the reconciliation module 204 of FIG. 2, which reconciles the cumulative contribution amount with the cumulative delivery value for the entity for the predetermined period of time.

In reconciling the cumulative contribution amount with the cumulative delivery value for the entity for the predetermined period of time, the surplus or deficit between the cumulative contribution amount and the cumulative delivery value can be determined. In some embodiments, based on the reconciliation, the baseline ratio of one or more of the plurality of tiers in the index can be adjusted. For example, when the cumulative contribution amount is equal to or less than the cumulative delivery value for the entity, the entity can be reclassified to another class having a greater baseline ratio than the first class. In another example, when the cumulative contribution amount is equal to or less than the cumulative delivery value for the entity, the baseline ratio of the first class can be increased for all entities within the first class.

In one example, when the cumulative contribution amount is greater than the cumulative delivery value for the entity, the entity can remain in the first class and retain the baseline ratio. In another example, when the cumulative contribution amount is greater than the cumulative delivery value for the entity, the entity can remain in the first class and the baseline ratio of the first class can be lowered. In yet another example, when the cumulative contribution amount meets and/or exceeds the cumulative delivery value for the entity by a threshold amount or threshold percentage that can be predetermined by the carrier, for example, the entity can remain in the first class and the baseline ratio of the first class can be lowered by a dynamic amount that is proportional to the surplus (e.g., when surplus exceeds 5% or 10%, multiply the surplus percentage by 0.5% and the lower baseline ratio by said factor), or a predetermined and fixed amount (e.g., between 0.025% to 1% or up to 5%).

As such, when reconciliation is performed and a deficit is determined, the deficit can be recouped by collecting currency or virtual currency, for example, from the entity or on behalf of the entity, wherein recoupment can account for all or a portion of the deficit. When reconciliation is performed and a surplus is determined, the surplus can be distributed to the carrier, the entity, and/or a third party using a currency or virtual currency, for example. As previously discussed, using a blockchain to account for each instance, instance values, delivery values, cumulative contribution amount, cumulative delivery value, deficit, and/or surplus, the reconciliation can be performed with increased accuracy.

In embodiments, the accuracy of the reconciliation can be supported by leveraging a distributed ledger system. The methods described herein can leverage a distributed ledger system that comprises data, the data being indicative of instances. The date can further be indicative of the physical transfer of items associated with the instances, digital assets associated with the instance and/or reconciliation (e.g., valuation in any currency and/or virtual currency), and/or any combination thereof. Each instance and data for each instance can be represented as a plurality of "blocks," wherein one block corresponds to one instance or transaction. Each later-in-time instance can be generated as a new block that can be electronically added and linked to prior-in-time blocks, thus providing a linked blockchain indicative of each instance for which data can be stored in the distributed ledger. Moreover, each block can comprise data identifying a particular instance, instance characteristics, entity, entity characteristics, an entity's carrier services behavior (e.g., type, volume, service level used by entity when acting as a customer of a carrier), one or more items, item characteristics, currency type, value of each time, value of all items associated with an instance, currency exchange rate at the time the block is generated, average value per item, purchase, purchaser characteristics (e.g., shopping behavior and patterns), delivery zone of each of the one or more items, location identifier, address, and/or addresses that are each indicative of an entity, recipient, carrier, and/or location having prior, present, or future control over the item, in embodiments. Additionally or alternatively, each block can comprise data identifying a particular instance, the characteristics of the instance, one or more tiers associated with the instance, one or more classes associated with an entity, one or more baseline ratios associated with the instance, an instance value, one or more contribution amounts, one or more delivery values, and the like, as previously described in detail. In various embodiments, a new block can be generated and added to a blockchain of the distributed ledger upon receipt of information and/or data indicating that an instance is instantiated, an instance is in progress, and/or that an instance is being or has been fulfilled by an entity, and/or a change in control of an item, for example, from an entity to a carrier, and/or from a carrier to a recipient (e.g., progressive parcel tracking using identifier scanning and near real-time location tracking of a parcel through carrier distribution channels and/or via delivery vehicles). It can be further contemplated that each block can be associated with and/or include a timestamp that can be generated by a computing node upon receiving a notice or data of the instance. Using the data encoded and encrypted in each block, and/or using timestamps within the predetermined period of time, for example, the method 400 reconciles the cumulative contribution amount with the cumulative delivery value for the entity for the predetermined period of time.

As the distributed ledger is immutable, accuracy of the reconciliation provides an improvement over existing technologies.

In further embodiments, based on the reconciliation, the method 400 determines the entity corresponds to a second class of the index. In such an example, the second class can be associated with a baseline ratio that can be different from the baseline ratio associated with the first class. In one such embodiment, the baseline ratio associated with the second class can be greater than the baseline ratio associated with the first class. In another embodiment, the baseline ratio associated with the second class can be less than the baseline ratio associated with the first class. The entity can be determined to correspond to the second class based on the characteristics of the entity, characteristics of the instances associated with the entity, characteristics of the items associated with the entity, and characteristics of the shipping, handling, insurance, and delivery of the items associated with the entity. Such characteristics can be encoded and stored in a database or a blockchain, for example, as previously described.

In some embodiments, the method 400 can be performed in a re-occurring fashion for a plurality of time periods and a plurality of entities, wherein each time period corresponds to the predetermined period of time. Each entity can be separately reconciled, for example, and class adjustments can be implemented regarding each entity and the index. Based on the reconciliation, the method 400 can modify the predetermined period of time for a subsequently performed reconciliation, wherein the predetermined period of time can be adjusted based on the cumulative delivery value for the entity. The predetermined period of time can be 24 hours or more in duration. In some embodiments, the predetermined period of time corresponds to two weeks, one month, three months, a quarter of a year, four months, six months, half of a year, eight months, or one year. In one example of adjusting the duration of the predetermined period of time, the method 400 can modify the predetermined period of time for one or more subsequent reconciliations by shortening the duration of the predetermined period of time when the cumulative delivery value for the entity meets or exceeds the cumulative contribution amount. In one such example, the duration of the predetermined period of time for a subsequent reconciliation can be shortened when the reconciliation determines there is a deficit between the cumulative contribution amount and the cumulative delivery value, in embodiments. The duration of the predetermined period of time for a subsequent reconciliation can be shortened when such a deficit reaches or exceeds a threshold amount or threshold percentage.

Additionally or alternatively, the duration of the predetermined period of time can be shortened when a deficit is determined by reconciliation for multiple consecutive periods of time. In another example, the method 400 can modify the predetermined period of time for a subsequent reconciliation by lengthening the duration of the predetermined period of time when the cumulative delivery value for the entity belonging to the first class is less than the cumulative contribution amount. As such, the predetermined period of time for a subsequent reconciliation can be shortened when the reconciliation determines there is a surplus between the cumulative contribution amount and the cumulative delivery value, in embodiments. The predetermined period of time for a subsequent reconciliation can be lengthened when such a surplus reaches or exceeds a threshold amount or threshold percentage. Additionally or alternatively, the predetermined period of time can be lengthened when a surplus is determined by reconciliation for multiple consecutive periods of time. In various embodiments, the duration of the predetermined period of time can be adjusted based on one or more reconciliations for one or more entities, and/or, can further be adjusted and customized for each tier, each class, and/or each combination of tier and class within the index.

Turning to FIG. 5, a flowchart of an exemplary method 500 is described in accordance with an embodiment of the present disclosure. The method 500 can be performed by processing logic that comprises hardware (e.g., circuitry, dedicated logic, programmable logic, microcode, etc.), software (e.g., instructions run on a processor to perform hardware simulation), firmware, or a combination thereof. The following description is provided for exemplary purposes only. In some embodiments, one or more non-transitory computer-readable media store computer-executable instructions that, when executed by one or more computing devices, cause the one or more computing devices to perform the method 500. As some aspects of the method 500 herein have been described previously, additional description of some steps are omitted for brevity, yet it will be understood that the description regarding the other methods herein applies to some or all aspects of method 500. In some embodiments, the method 500 is performed using a computing device, such as can comprise the control server 102 and modules shown in FIGS. 1 and 2.

In embodiments, for each of a plurality of entities conducting e-commerce, the method 500 determines whether an entity corresponds to a first class of an index having a plurality of classes, shown at block 502, and as described in detail hereinabove. In an embodiment, the method 500, for each of a plurality of entities conducting e-commerce, determines, via a computing device, whether an entity corresponds to a first class of an index having a plurality of classes. In such an embodiment, the computing device can include a module, such as the instance assignment module 202 of FIG. 2, which determines whether an entity corresponds to a first class of an index having a plurality of classes.

At block 504, the method 500 provides a baseline ratio for the entity, the baseline ratio being a predetermined value associated with the first class and fixed for a predetermined period of time, as previously described, based on the entity being aligned with the first class and the instance value being aligned with a particular tier in the index. In an embodiment, the method 500, provides, by a computing device, a baseline ratio for the entity, the baseline ratio being a predetermined value associated with the first class and fixed for a predetermined period of time. In such an embodiment, the computing device can include a module, such as the instance assignment module 202 of FIG. 2, which provides a baseline ratio for the entity.

For each of the one or more instances fulfilled by the entity, the method 500 comprises determining an instance value multiplied by the baseline ratio associated with the first class, as shown at block 506. In an embodiment, the method 500 determines, by a computing entity, the instance value multiplied by the baseline ratio associated with the first class. In such an embodiment, the computing device can include a module, such as the instance assignment module 202 and/or the reconciliation module 204 of FIG. 2, which determines an instance value multiplied by the baseline ratio associated with the first class.

Further, at block 508, the method 500 comprises determining a delivery value associated with delivery of the item(s) of an instance, for each of the one or more instances fulfilled by the entity. In an embodiment, the method 500 determines, by a computing device, a delivery value associated with delivery of the item(s) of an instance, for each of one or more instances fulfilled by the entity. In such an embodiment, the computing device can include a module, such as the instance assignment module 202 and/or the reconciliation module 204 of FIG. 2, which determine a delivery value associated with delivery of the item(s) of an instance, for each of one or more instances fulfilled by the entity.

At block 510, the method 500 determines a cumulative contribution amount of the one or more instances fulfilled by the entity during the predetermined period of time. In an embodiment, the method 500 determines, by a computing device, a cumulative contribution amount of the one or more instances fulfilled by the entity during the predetermined period of time. In such an embodiment, the computing device can include a module, such as the instance assignment module 202 and/or the reconciliation module 204 of FIG. 2, which determine the cumulative contribution amount of the one or more instances fulfilled by the entity during the predetermined period of time.

And at block 512, the method 500 determines a cumulative delivery value of deliveries associated with the one or more instances fulfilled by the entity during the predetermined period of time. At block 514, the method 500 reconciles the cumulative contribution amount with the cumulative delivery value for the entity for the predetermined period of time, as previously described. In an embodiment, the method 500 determines, by a computing device, a cumulative delivery value of deliveries associated with the one or more instances fulfilled by the entity during the predetermined period of time. In such an embodiment, the computing device can include a module, such as the instance assignment module 202 and/or the reconciliation module 204 of FIG. 2, which determine the cumulative delivery value of deliveries associated with the one or more instances fulfilled by the entity during the predetermined period of time.

In some embodiments, for each of the one or more instances fulfilled by a plurality of entities for the plurality of time periods, the method 500 can monitor item-specific characteristics of each instance. Then, based on the reconciliation and the item-specific characteristics monitored of the one or more instances fulfilled by the plurality of entities for the plurality of time periods, the method 500 can modify the index by reducing the plurality of classes in number to simplify the index. In such an embodiment, the method 500 can maintain a greatest baseline ratio for each of the plurality of classes in the index that remain after the reduction. The number of classes can be modified by determining related characteristics between the pluralities of entities, instances, items, and delivery data, for example. Additionally or alternatively, the tiers can also be adjusted and modified to be reduced or increased in number, and/or the number of tiers can be maintained while the value ranges can be modified.

In another embodiment, based on the reconciliation, the method 500 determines whether the entity corresponds to a second class of the index, wherein the second class can be associated with a baseline ratio that is different from the baseline ratio associated with the first class. When the method 500 determines the entity corresponds to a second class of the index, the entity can be assigned (e.g., reassigned) to the second class in the index. In further embodiments, subsequent to assigning the entity to the second class in the index, the method 500 can be performed for a subsequent period of time for the entity as now-assigned to the second class. For example, the method 500 can determine an instance value multiplied by the baseline ratio associated with the second class for each of the one or more instances fulfilled by the entity in a subsequent predetermined period of time, in such an example. Further, the method 500 can determine a delivery value associated with delivery of the instance for each of the one or more instances fulfilled by the entity in a subsequent predetermined period of time, in this example. Then, the method 500 can determine a cumulative contribution amount of the one or more instances fulfilled by the entity during the subsequent predetermined period of time. The method 500 can continue by determining a cumulative delivery value of deliveries associated with the one or more instances during the subsequent predetermined period of time, in such an example. The method 500 can then reconcile the cumulative contribution amount with the cumulative delivery value for the entity for the subsequent predetermined period of time, in such embodiments.

In some embodiments, the method 500 can be performed in a reoccurring fashion for a plurality of predetermined periods of time and a plurality of entities. As such, entities, the index, classes, tiers, and baseline ratios can be modified over time to more accurately reflect the characteristics, previously discussed, based on the reconciliation and any surplus or deficit, as previously described. For example, in an embodiment, the method 500 reconciles the cumulative contribution amount with the cumulative delivery value for a plurality of entities for each of the plurality of predetermined periods of time. The method 500 can then modify the baseline ratio associated with the first class based on reconciling the cumulative contribution amount with the cumulative delivery value for the plurality of entities for each of the plurality of predetermined periods of time, in some embodiments. As such, the baseline ratio associated with the first class can be modified by increasing the baseline ratio when, based on reconciliation, the cumulative contribution amount is equal to or less than the cumulative delivery value, or the baseline ratio associated with the first class can be modified by decreasing the baseline ratio, based on reconciliation, when the cumulative contribution amount exceeds the cumulative delivery value.

Turning to FIG. 6, a flowchart of an exemplary method 600 is described in accordance with an embodiment of the present disclosure. The method 600 can be performed by processing logic that comprises hardware (e.g., circuitry, dedicated logic, programmable logic, microcode, etc.), software (e.g., instructions run on a processor to perform hardware simulation), firmware, or a combination thereof. The following description is provided for exemplary purposes only. In some embodiments, one or more non-transitory computer-readable media store computer-executable instructions that, when executed by one or more computing devices, cause the one or more computing devices to perform the method 600. In another embodiment, the method 600 can be performed via a system comprising at least one first computing device having at least one processor, and at least one computer-readable storage medium having program instructions embodied therewith, wherein the program instructions readable or executable by at least one processor cause the system to perform the method 600. The computing device can comprise the control server 102 shown in FIGS. 1 and 2, in some embodiments. Each of the modules discussed previously regarding other methods herein can be used in the same or similar manner to perform various aspects of method 600, via a computing device comprising, for example, the control server 102 of FIGS. 1-2. As some aspects of the method 600 herein have been described previously, additional description of some steps are omitted for brevity, yet it will be understood that the description herein regarding other methods applies to some or all aspects of method 600.

At block 602, the method 600 determines an entity corresponds to a first class of a pricing index having a plurality of characteristic classes, as previously discussed. At block 604, the method 600 provides a baseline value to the entity, the baseline ratio being a predetermined value associated with the first class and fixed for a predetermined period of time. At block 606, for each of the one or more instances fulfilled by the entity that corresponds to the first class, the method 600 determines an instance value multiplied by the baseline ratio associated with the first class. Additionally, the method 600 determines a delivery value associated with delivery of the instance for each of the one or more instances fulfilled by the entity that corresponds to the first class, shown at block 608. At block 610, the method 600 determines a cumulative contribution amount of the one or more instances fulfilled by the entity during the predetermined period of time, as previously described. At block 612, the method determines a cumulative delivery value of deliveries associated with the one or more instances during the predetermined period of time. At block 614, the method 600 reconciles the cumulative contribution amount with the cumulative delivery value for the entity for the predetermined period of time, as described above.

Continuing to FIG. 7, a flowchart of an exemplary method 700 is described in accordance with an embodiment of the present disclosure. The method 700 can be performed by processing logic that comprises hardware (e.g., circuitry, dedicated logic, programmable logic, microcode, etc.), software (e.g., instructions run on a processor to perform hardware simulation), firmware, or a combination thereof. The following description is provided for example purposes only. In some embodiments, one or more non-transitory computer-readable media store computer-executable instructions that, when executed by one or more computing devices, cause the one or more computing devices to perform the method 700. In another embodiment, the method 700 can be performed via a system comprising at least one first computing device having at least one processor, and at least one computer-readable storage medium having program instructions embodied therewith, wherein the program instructions readable or executable by at least one processor cause the system to perform the method 700. The computing device can comprise the control server 102 shown in FIGS. 1 and 2, in some embodiments. Each of the modules discussed previously regarding other methods herein can be used in the same or similar manner to perform various aspects of method 700, via a computing device comprising, for example, the control server 102 of FIGS. 1-2. As some aspects of the method 700 herein have been described previously, additional description of some steps are omitted for brevity, yet it will be understood that the description herein regarding other methods applies to some or all aspects of method 700.

In some embodiments, subsequent to reconciling a cumulative contribution amount with a cumulative delivery value for an entity as described hereinabove, the method 700 can be used to periodically or intermittently update the classes, tiers, and/or baseline ratios previously discussed. For example, using the method 700, the index from which value and cost estimations are determined can be dynamically updated on a periodic basis based on actual costs and predicted estimations, such that a fair distribution of costs can be automatically determined for subsequent reconciliation or "settlements." Existing and conventional technologies fail to capture these aspects.

In one example, the method 700 can be used to generate one or more additional tiers for handling items wherein the calculated cumulative contribution value is less than a threshold value of the cumulative delivery value for the predetermined period of time, in some embodiments. Additionally or alternatively, the method 700 can be used to generate one or more additional tiers when the calculated cumulative contribution value is less than a predefined percentage of the cumulative delivery value percentage for the predetermined period of time, in another embodiment. Thus, in various embodiments, the method 700 facilitates an automatic feedback mechanism that automatically updates, modifies, and/or "corrects" the plurality of classes, the plurality of tiers, the plurality of baseline ratios, or a combination thereof in the index, to structure the reconciliation so that the cumulative contribution amount is or is predicted to be, as determined for future instance(s) during a subsequent predetermined period of time, within a predefined percentage or predetermined margin (range) of the cumulative delivery value.

Beginning at block 702, subsequent to reconciling a cumulative contribution amount with a cumulative delivery value for an entity as described hereinabove, the method 700 can determine to assign or re-assign the entity associated with the instance(s) used for the reconciliation to a different class or a new class in the index. Generally, the entity (i.e., seller) can be re-assigned to a new class or a different class in the index based on whether a surplus of revenue or a deficit of cost to the carrier resulted from the reconciliation. In some embodiments, as described with regard to method 400 of FIG. 4, for example, based on the reconciliation, the entity can be determined to correspond to a second class of the index for future instances, instead of the first class used for the prior instances within the predetermined period of time. In such an example, the second class can be associated with a baseline ratio that can be different (e.g., greater or lower) from the baseline ratio associated with the first class. The entity can be determined to correspond to the second class based on one or more of the characteristics of the entity, characteristics of the instances associated with the entity, characteristics of the items associated with the entity, and/or characteristics of the shipping, handling, insurance, and delivery of the items associated with the entity. Such characteristics can be encoded and stored in a database or a blockchain, for example, as previously described.

In some embodiments, the method 700 determines that the entity associated with the instance(s) used for the reconciliation is to be re-assigned to a new class. For example, the entity may not be a good "fit" within the existing plurality of classes in the index based on the actual cost used to ship the type of items in the orders/instances relative to the values of the items in the orders/instances for the specific entity and/or specific item classes being shipped by the entity. In one example, an item can have a high delivery value (costly to ship due to one or more of weight, bulk, or location) relative to the corresponding instance value (purchase price for the item). As such, based on the reconciliation, the entity can be re-assigned to a new class in the index.

Alternatively, in some embodiments, an entity can be identified prior to any reconciliation, for example, when the entity registers with the control server 102 to participate in a program for reconciliation, and/or when an initial instance that corresponds to the entity is first received by the control server 102. In one such embodiment, the entity can provide additional information that specifies one or more of, for example: an actual or predicted weight of a specific item(s), an actual average or predicted average value for items, a number of actual or predicted orders to be received and/or completed within a predetermined period of time (e.g., per month, per quarter, per a first quarter of a year, per a last quarter of a year, annually, bi-monthly), a total value of sales or revenue within a predetermined period of time, a type or category of item sold or provided by the entity, the location of the entity, or the like, as previously discussed herein. The control server 102, for example, can determine that the entity is to be assigned to a new class in the index at any time, based on the additional information and/or one or more instances, and/or one or more reconciliations conducted over any number of predetermined periods of time.

At block 704, the method 700 generates a new class in the index. Although discussed in the singular here for simplicity, any number of new classes can be generated for one entity, or for a plurality of entities subsequent to corresponding reconciliations. In some embodiments, the new class can be assigned to one or more entities that are identified as "outliers" that do not fit (i.e., cannot be accurately sorted) into the existing index, for example, those entities providing items where the actual cost used to ship the items in the orders/instances relative to the values of the items in the orders/instances produces a deficit of cost for the carrier entity. In embodiments, the new class can be assigned to one or more entities that are identified as outliers that do not fit into the existing index, for example, those entities providing items where the actual cost used to ship the items in the orders/instances relative to the values of the items in the orders/instances produces a surplus of cost for the carrier entity (e.g., small lightweight items of high value).

At block 706, the entity is assigned to the new class. The association of an entity with a particular class can be stored in a database, in embodiments, as controlled by the carrier entity, in an embodiment. At block 708, the method 700 determines one or more new baseline ratios that correspond to a combination of the new class and each of the plurality of tiers within the index. In some embodiments, the baseline ratio is calculated using the surplus or deficit determined from the prior reconciliation, for example, wherein the baseline ratio is determined to reduce the surplus or reduce the deficit predicted in future reconciliations. Additionally or alternatively, the baseline ratio of the new class can be a percentage within a range of the baseline ratio of the first class to which the entity was previously determined to belong. In one example, the new baseline ratio is calculated by increasing or decreasing the existing baseline ratio of the first class to which the entity had previously corresponded by a percentage in the range of 0.01% and 5.0%. In another example, the new baseline ratio is associated with a "cap" that cannot be exceeded, such as, 1.5% of the baseline ratio that was most recently previously assigned to the entity. The percentage and/or range of percentage used to calculate the new baseline ratio for the new class can be based on the cumulative delivery value determined for one or more instances associated with the entity.

Accordingly, when one or more instances are subsequently received for a future predetermined period of time, for example, the instances can be determined to correspond to the new class based on the instances' association with the particular entity and/or a particular item class, and based on the instance value, the new baseline ratio can be used to calculate the contribution value for one or more subsequently received instances during a future predetermined period of time. In embodiments, when an instance that is associated with the entity is subsequently received, the method 700 determines that the instance corresponds to the entity and the new class to which the entity was assigned, shown at block 710. The assignment and re-assignment of an entity to a different existing class or to a new class can be performed at any time and any number of times, whether at onboarding into the reconciliation program, based on receipt of an instance, or after one or more reconciliations have been completed for one or more different periods of times.

The exemplary methods illustrated in FIGS. 3-7 can, for example, be performed using or communicating with the systems and/or devices described hereinafter. In this regard, a system and/or device can directly or indirectly, perform the steps, blocks, and/or operations through the use of one or more of processing elements, non-volatile memory, and volatile memory. It will be understood that the system and/or device comprises a set of hardware components or hardware components coupled with software components configured to autonomously or automatically perform the methods described previously, in some embodiments. Such components can, for instance, utilize a processing element to execute operations, and can utilize non-volatile memory to store computer code executed by the processing element, as well as to store relevant intermediate or ultimate output of the system or apparatus. It should also be appreciated that, in some embodiments, the system and/or device can include a separate processor, specially configured field programmable gate array (FPGA) or application specific interface circuit (ASIC), to perform its corresponding functions. In addition, computer program instructions and/or other type of code can be loaded onto a computer, processor, or other programmable apparatus's circuitry to produce a machine, such that the computer, processor, or other programmable circuitry can execute the code on the machine to create the means for implementing the various functions described in connection with the shipper behavior prediction engine.

Moreover, although values with regard to percentages have been discussed herein in the relative scale of zero to 10%, it will be understood that any percentage scale is contemplated to be within the scope of the invention.

The details of one or more embodiments of the subject matter described in this specification are set forth in the accompanying drawings and the description below. Other features, aspects, and advantages of the subject matter will become apparent from the description, the drawings, and the claims.

Computer Program Products, Methods, and Computing Entities

Embodiments of the present disclosure can be implemented in various ways, including as computer program products that comprise articles of manufacture. A computer program product can include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium can include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium can also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium can also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium can also include conductive-bridging random access memory (CBRAM), phase-change random access memory (PRAM), ferroelectric random-access memory (FeRAM), non-volatile random-access memory (NVRAM), magneto-resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium can include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media can be substituted for or used in addition to the computer-readable storage media described above.

As should be appreciated, various embodiments of the present disclosure can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Embodiments of the present disclosure are described below with reference to block diagrams and flowchart illustrations. Thus, it should be understood that each block of the block diagrams and flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some exemplary embodiments, retrieval, loading, and/or execution can be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 8 provides an illustration of an exemplary embodiment of the present disclosure. As shown in FIG. 8, this particular embodiment can include a manual vehicle 800, a computing entity 802, mobile computing entities 804*a*, 804*b*, 804*c*, 804*d*, 804*e*, and 804*f* (i.e., 804*a-f*), a satellite 806, an autonomous vehicle 810, a network 812, and/or an information/data collection device 814 (e.g., telematics device). Each of these components, entities, devices, systems, and similar words used herein interchangeably can be in direct or indirect communication with, for example, one another over the same or different wired or wireless networks. Additionally, while FIG. 8 illustrates the various system entities as separate, standalone entities, the various embodiments are not limited to this particular architecture. Furthermore, although shown in the singular, it will be understood from this description that each component can occur in the plural.

1. Exemplary Computing Entities

FIG. 9 provides a schematic of a computing entity 802 according to particular embodiments of the present disclosure. In general, the terms computing entity, computer, entity, device, system, and/or similar words used herein interchangeably can refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes can include, for example, transmitting, receiving, processing, displaying, storing, determining, creating/generating, monitoring, evaluating, comparing, operating on and/or similar terms used herein interchangeably. In particular embodiments, these functions, operations, and/or processes can be performed on data, content, information/data, and/or similar terms used herein interchangeably.

As indicated, in particular embodiments, the computing entity 802 can also include one or more communications interfaces 900 for communicating with various computing entities, such as by communicating data, content, information/data, and/or similar terms used herein interchangeably that can be transmitted, received, operated on, processed, displayed, stored, and/or the like. As shown in FIG. 9, in particular embodiments, the computing entity 802 can include or be in communication with a processing element 902 (also referred to as processors, processing circuitry, and/or similar terms used herein interchangeably) that communicate with other elements within the computing entity 802 via a bus, for example. As will be understood, the processing element 902 can be embodied in a number of different ways. For example, the processing element 902 can be embodied as one or more complex programmable logic devices (CPLDs), microprocessors, multi-core processors, co-processing entities, application-specific instruction-set processors (ASIPs), microcontrollers, and/or controllers. Further, the processing element 902 can be embodied as one or more other processing devices or circuitry. The term circuitry can refer to an entirely hardware embodiment or a combination of hardware and computer program products. Thus, the processing element 902 can be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 902 can be configured for a particular use or configured to execute instructions stored in volatile or non-volatile media 904 or otherwise accessible to the processing element 902. As such, whether configured by hardware or computer program products, or by a combination thereof, the processing element 902 can be capable of performing steps or operations according to embodiments of the present disclosure when configured accordingly.

In particular embodiments, the computing entity 802 can further include or be in communication with non-volatile media 904 (also referred to as non-volatile storage, memory, memory storage, memory circuitry, and/or similar terms used herein interchangeably). In particular embodiments, the non-volatile storage or memory can include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media can store databases (e.g., item database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably can refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the computing entity 802 can further include or be in communication with volatile media 906 (also referred to as volatile storage, memory, memory storage, memory circuitry and/or similar terms used herein interchangeably). In particular embodiments, the volatile storage or memory can also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media can be used to store at least portions of the databases, database instances, database management systems, data, applications, programs, program modules, scripts, source code, object code, byte code, compiled code, interpreted code, machine code, executable instructions, and/or the like being executed by, for example, the processing element 902. Thus, the databases, database instances, database management systems, data, applications, programs, program modules, scripts, source code, object code, byte code, compiled code, interpreted code, machine code, executable instructions, and/or the like can be used to control certain aspects of the operation of the computing entity 802 with the assistance of the processing element 902 and operating system.

As indicated, in particular embodiments, the computing entity 802 can also include one or more communications interfaces 900 for communicating with various computing entities, such as by communicating information/data, content, information/data, and/or similar terms used herein interchangeably that can be transmitted, received, operated on, processed, displayed, stored, and/or the like. Such communication can be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the computing entity 802 can be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the computing entity 802 can include or be in communication with one or more input elements, such as a keyboard input, a mouse input, a touchscreen/display input, motion input, movement input, audio input, pointing device input, joystick input, keypad input, and/or the like. The computing entity 802 can also include or be in communication with one or more output elements (not shown), such as audio output, video output, screen/display output, motion output, movement output, and/or the like.

As will be appreciated, one or more of the components of the computing entity 802 can be located remotely from other components of the computing entity 802, such as in a distributed system. Furthermore, one or more of the components can be combined and additional components performing functions described herein can be included in the computing entity 802. Thus, the computing entity 802 can be adapted to accommodate a variety of needs and circumstances. As will be recognized, these architectures and descriptions are provided for exemplary purposes only and are not limiting to the various embodiments.

2. Exemplary User Computing Entity

Mobile computing entities 804*a-f* can be configured for autonomous operation and/or for operation by a user (e.g., a vehicle operator, delivery personnel, customer, and/or the like). In certain embodiments, mobile computing entities 804*a-f* can be embodied as handheld computing entities, such as mobile phones, tablets, personal digital assistants, and/or the like, that can be operated at least in part based on user input received from a user via an input mechanism. Moreover, mobile computing entities 804a-f can be embodied as onboard vehicle computing entities, such as central vehicle electronic control units (ECUs), onboard multimedia system, and/or the like that can be operated at least in part based on user input. Such onboard vehicle computing entities can be configured for autonomous and/or nearly autonomous operation however, as they can be embodied as onboard control systems for autonomous or semi-autonomous vehicles, such as unmanned aerial vehicles (UAVs), robots, and/or the like. As a specific example, mobile computing entities 804a-f can be utilized as onboard controllers for UAVs configured for picking-up and/or delivering packages to various locations, and accordingly such mobile computing entities 804a-f can be configured to monitor various inputs (e.g., from various sensors) and generate various outputs (e.g., control instructions received by various vehicle drive mechanisms). It should be understood that various embodiments of the present disclosure can comprise a plurality of mobile computing entities 804a-f embodied in one or more forms (e.g., handheld mobile computing entities, vehicle-mounted mobile computing entities, and/or autonomous mobile computing entities).

As will be recognized, a user can be an individual, a family, a company, an organization, an entity, a department within an organization, a representative of an organization and/or person, and/or the like—whether or not associated with a carrier. In one embodiment, a user can operate one or more of the mobile computing entities 804a-f that can include one or more components that are functionally similar to those of the manual vehicle 800.

FIG. 10 provides an illustrative schematic representative of one of the mobile computing entities 804a-f that can be used in conjunction with embodiments of the present disclosure. In general, the terms device, system, computing entity, entity, and/or similar words used herein interchangeably can refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Mobile computing entities 804a-f can be operated by various parties, including carrier personnel (sorters, loaders, delivery drivers, network administrators, and/or the like). As shown in FIG. 10, the mobile computing entities 804a-f can include an antenna 1000, a transmitter 1002 (e.g., radio), a receiver 1004 (e.g., radio), and a processing device 1006 (e.g., CPLDs, microprocessors, multi-core processors, co-processing entities, ASIPs, microcontrollers, and/or controllers) that provides signals to and receives signals from the transmitter 1002 and receiver 1004, respectively.

The signals provided to and received from the transmitter 1002 and receiver 1004, respectively, can include signaling information in accordance with air interface standards of applicable wireless systems. In this regard, the mobile computing entities 804a-f can be capable of operating with one or more air interface standards, communication protocols, modulation types, and access types. More particularly, the mobile computing entities 804a-f can operate in accordance with any of a number of wireless communication standards and protocols, such as those described above with regard to the manual vehicle 800. In a particular embodiment, the mobile computing entities 804a-f can operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile computing entities 804a-f can operate in accordance with multiple wired communication standards and protocols, such as those described above with regard to the manual vehicle 800 via a network interface 1008.

Via these communication standards and protocols, the mobile computing entities 804a-f can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entities 804a-f can also download changes, add-ons, and updates, for instance, to its firmware, software (e.g., including executable instructions, applications, program modules), and operating system.

According to one embodiment, the mobile computing entities 804a-f can include location determining aspects, devices, modules, functionalities, and/or similar words used herein interchangeably. For example, the mobile computing entities 804a-f can include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris information/data, by identifying the number of satellites in view and the relative positions of those satellites (e.g., using global positioning systems (GPS)). The satellites can be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the position of the mobile computing entities 804a-f in connection with a variety of other systems, including cellular towers, Wi-Fi access points, and/or the like. Similarly, the mobile computing entities 804a-f can include indoor positioning aspects, such as a location module adapted to acquire, for example, latitude, longitude, altitude, geocode, course, direction, heading, speed, time, date, and/or various other information/data. Some of the indoor systems can use various position or location technologies including RFID tags, indoor beacons or transmitters, Wi-Fi access points, cellular towers, nearby computing devices/entities (e.g., smartphones, laptops) and/or the like. For instance, such technologies can include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile computing entities 804*a-f* can also comprise a user interface (that can include a display 1010 coupled to the processing device 1006) and/or a user input interface (coupled to a processing device 1006). For example, the user interface can be a user application, browser, user interface, and/or similar words used herein interchangeably executing on and/or accessible via the mobile computing entities 804*a-f* to interact with and/or cause display of information from the manual vehicle 800, as described herein. The user input interface can comprise any of a number of devices or interfaces allowing the mobile computing entities 804*a-f* to receive information/data, such as a keypad 1012 (hard or soft), a touch display, voice/speech or motion interfaces, or other input device. In some embodiments including a keypad 1012, the keypad 1012 can include (or cause display of) the numeric (i.e., 0-9) and related keys (e.g., #, *), and other keys used for operating the mobile computing entities 804*a-f*, and can include a full set of alphabetic keys or set of keys that can be activated to provide a full set of alphanumeric keys. In addition to providing input, the user input interface can be used, for example, to activate or deactivate certain functions, such as screen savers and/or sleep modes.

As shown in FIG. 10, the mobile computing entities 804*a-f* can also include an camera 1014, imaging device, and/or similar words used herein interchangeably (e.g., still-image camera, video camera, IoT enabled camera, IoT module with a low resolution camera, a wireless enabled MCU, and/or the like) configured to capture images. The mobile computing entities 804*a-f* can be configured to capture images via the camera 1014, and to store those imaging devices locally, such as in the volatile memory 1016 and/or non-volatile memory 1018 of the mobile computing entities 804*a-f*. As discussed herein, the mobile computing entities 804*a-f* can be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 1014. The contextual data can be stored as a portion of the image (such that a visual representation of the image data includes the contextual data) and/or can be stored as metadata associated with the image data that can be accessible to various computing entities. Additionally or alternatively, the image and/or contextual data can be stored in association with an instance and/or delivery of an instance, for example, using blockchain technology.

The mobile computing entities 804*a-f* can include other input mechanisms, such as scanners (e.g., barcode scanners), microphones, accelerometers, RFID readers, and/or the like configured to capture and store various information types for the mobile computing entities 804*a-f*. For example, a scanner can be used to capture item information/data from an item indicator disposed on a surface of a shipment or other item. In certain embodiments, the mobile computing entities 804*a-f* can be configured to associate any captured input information/data, for example, via the processing device 1006. For example, scan data captured via a scanner can be associated with image data captured via the camera 1014 such that the scan data is provided as contextual data associated with the image data.

The mobile computing entities 804*a-f* can also include volatile memory 1016 and/or non-volatile memory 1018, which can be embedded and/or can be removable. For example, the non-volatile memory 1018 can be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 1016 can be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile memory 1016 and non-volatile memory 1018 can store databases, database instances, database management systems, information/data, applications, programs, program modules, scripts, source code, object code, byte code, compiled code, interpreted code, machine code, executable instructions, and/or the like to implement the functions of the mobile computing entities 804*a-f*. As indicated, this can include a user application that is resident on the entity or accessible through a browser or other user interface for communicating with the manual vehicle 800 and/or various other computing entities. In another embodiment, the mobile computing entities 804*a-f* can include one or more components or functionality that are the same or similar to those of the manual vehicle 800, as described in greater detail above. As will be recognized, these architectures and descriptions are provided for exemplary purposes only and are not limiting to the various embodiments.

3. Exemplary Mobile Computing Entities

The mobile computing entities 804*a-f* can be configured for autonomous operation (e.g., in association with the autonomous vehicle 810) and/or for operation by a user (e.g., a vehicle operator, delivery personnel, customer, and/or the like). In certain embodiments, mobile computing entities 804*a-f* can be embodied as handheld computing entities, such as mobile phones, tablets, personal digital assistants, and/or the like, that can be operated at least in part based on user input received from a user via an input mechanism. Moreover, mobile computing entities 804*a-f* can be embodied as onboard vehicle computing entities, such as central vehicle electronic control units (ECUs), onboard multimedia system, and/or the like that can be operated at least in part based on user input. Such onboard vehicle computing entities can be configured for autonomous and/or nearly autonomous operation however, as they can be embodied as onboard control systems for autonomous or semi-autonomous vehicles, such as unmanned aerial vehicles (UAVs), robots, and/or the like. As a specific example, mobile computing entities 804*a-f* can be utilized as onboard controllers for UAVs configured for picking-up and/or delivering packages to various locations, and accordingly such mobile computing entities 804*a-f* can be configured to monitor various inputs (e.g., from various sensors) and generate various outputs (e.g., control instructions received by various vehicle drive mechanisms).

As will be recognized, a user can be an individual, a family, a company, an organization, an entity, a department within an organization, a representative of an organization and/or person, and/or the like, whether or not associated with a carrier. In particular embodiments, a user can operate one or more of the mobile computing entities 804*a-f* that can include one or more components that are functionally similar to those of the computing entity 802. FIG. 10 provides an illustrative schematic representative of a singular of the mobile computing entities 804*a-f* that can be used in conjunction with embodiments of the present disclosure. In general, the terms device, system, computing entity, entity, and/or similar words used herein interchangeably can refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Mobile computing entities 804a-f can be operated by various parties, including carrier personnel (sorters, loaders, delivery drivers, network administrators, and/or the like). As shown in FIG. 10, the mobile computing entities 804a-f can include an antenna 1000, a transmitter 1002, a receiver 1004, and a processing device 1006 that provides signals to and receives signals from the transmitter 1002 and receiver 1004, respectively. As discussed hereinafter, statements made in regard to the mobile computing entities 804a-f in the plural can also refer to a singular mobile computing entity, and the use of singular or plural form is not intended to be construed as a limitation, but serves only as a grammatical choice for consistency throughout this description.

The signals provided to and received from the transmitter 1002 and the receiver 1004, respectively, can include signaling information in accordance with air interface standards of applicable wireless systems. In this regard, the mobile computing entities 804a-f can be capable of operating with one or more air interface standards, communication protocols, modulation types, and access types. More particularly, the mobile computing entities 804a-f can operate in accordance with any of a number of wireless communication standards and protocols, such as those described above with regard to the computing entity 802. In a particular embodiment, the mobile computing entities 804a-f can operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile computing entities 804a-f can operate in accordance with multiple wired communication standards and protocols, such as those described above with regard to the computing entity 802 via the network interface 1008.

According to particular embodiments, the mobile computing entities 804a-f can include location determining aspects, devices, modules, functionalities, and/or similar words used herein interchangeably. For example, the mobile computing entities 804a-f can include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites can be a variety of different satellites. Alternatively, the location information can be determined by triangulating the position of one or more of the mobile computing entities 804a-f in connection with a variety of other systems, including cellular towers, Wi-Fi access points, and/or the like. Similarly, the mobile computing entities 804a-f can include indoor positioning aspects, such as a location module adapted to acquire, for example, latitude, longitude, altitude, geocode, course, direction, heading, speed, time, date, and/or various other information/data. Some of the indoor systems can use various position or location technologies including RFID tags, indoor beacons or transmitters, Wi-Fi access points, cellular towers, nearby computing devices/entities (e.g., smartphones, laptops) and/or the like. For instance, such technologies can include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile computing entities 804a-f can also comprise a user interface and/or a user input interface. For example, the user interface can be a user application, browser, user interface, and/or similar words used herein interchangeably executing on and/or accessible via the mobile computing entities 804a-f to interact with and/or cause display of information from the computing entity 802, as described herein. The user input interface can comprise any of a number of devices or interfaces allowing the mobile computing entities 804a-f to receive information/data, such as a keypad 1012 (hard or soft), a touch display, voice/speech or motion interfaces, or other input device. In embodiments including a keypad 1012, the keypad 1012 can include (or cause display of) the conventional numeric (0-9) and related keys (#, *), and other keys used for operating the mobile computing entities 804a-f, and can include a full set of alphabetic keys or set of keys that can be activated to provide a full set of alphanumeric keys. In addition to providing input, the user input interface can be used, for example, to activate or deactivate certain functions, such as screen savers and/or sleep modes.

As shown in FIG. 10, the mobile computing entities 804a-f can also include a camera 1014, imaging device, and/or similar words used herein interchangeably (e.g., still-image camera, video camera, IoT enabled camera, IoT module with a low resolution camera, a wireless enabled MCU, and/or the like) configured to capture images. The mobile computing entities 804a-f can be configured to capture images via the camera 1014, and to store those imaging devices/cameras locally, such as in the volatile memory 1016 and/or non-volatile memory 1018. As discussed herein, the mobile computing entities 804a-f can be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 1014. The contextual data can be stored as a portion of the image (such that a visual representation of the image data includes the contextual data) and/or can be stored as metadata associated with the image data that can be accessible to various computing entities.

The mobile computing entities 804a-f can include other input mechanisms, such as scanners (e.g., barcode scanners), microphones, accelerometers, RFID readers, and/or the like configured to capture and store various information types for the mobile computing entities 804a-f. For example, a scanner can be used to capture item information/data from an item indicator disposed on a surface of a shipment or other item. In certain embodiments, the mobile computing entities 804a-f can be configured to associate any captured input information/data, for example, via the processing device

1006. For example, scan data captured via a scanner can be associated with image data captured via the camera 1014 such that the scan data is provided as contextual data associated with the image data.

The mobile computing entities 804a-f can also include volatile memory 1016 and/or non-volatile memory 1018, which can be embedded and/or removable. For example, the non-volatile memory 1018 can be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 1016 can be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the mobile computing entities 804a-f. As indicated, this can include a user application that is resident on the entity or accessible through a browser or other user interface for communicating with the computing entity 802 and/or various other computing entities.

In another embodiment, the mobile computing entities 804a-f can include one or more components or functionality that are the same or similar to those of the computing entity 802, as described in greater detail above. As will be recognized, these architectures and descriptions are provided for exemplary purposes only and are not limiting to the various embodiments.

4. Exemplary Item

A package, item, or shipment can be any tangible and/or physical object. As used herein, the terms "package," "item," and "shipment" are used interchangeably, and the terms are not to be construed as limiting a package, item, or shipment to the singular or plural. An item can be picked up and/or delivered by a carrier/transporter. In one embodiment, an item can be enclosed in one or more packages, parcels, bags, containers, loads, crates, items banded together, vehicle parts, pallets, drums, the like, and/or similar words used herein interchangeably. An item can include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. For example, the item can be configured to communicate with one or more of the mobile computing entities 804a-f using a short/long range communication technology, as described in more detail below. Further, the item can have the capabilities and components described with regard to the occupancy computing entities, network 812, manual vehicle 800, autonomous vehicle 810, computing entity 802, user computing entities, and/or the like. For example, the item can be configured to store item information as item-specific data. In example embodiments, the item-specific data can comprise one or more of a consignee name, consignee identifier, an item identifier, a service point (e.g., delivery location, delivery address, pickup location, pickup address), instructions for delivering the item, items delivery authorization code, item-specific data regarding whether the mobile computing entities 804a-f is/are present at the service point, and/or the like. In this regard, in some example embodiments, an item can communicate send "to" address information/data, received "from" address information/data, unique identifier codes, and/or various other information/data. In one embodiment, an item can include an item identifier, such as an alphanumeric identifier. Such an item identifier can be represented as text, barcodes, tags, character strings, Aztec Codes, MaxiCodes, Data Matrices, Quick Response (QR) Codes, electronic representations, and/or the like. A unique item identifier (e.g., 123456789) can be used by the carrier to identify and track the item as it moves through the carrier's transportation network. Further, such an item identifier can be affixed to an item by, for example, using a sticker (e.g., label) with the unique item identifier printed thereon (in human and/or machine-readable form) or an RFID tag with the unique item identifier stored therein.

In various embodiments, the item information/data comprises identifying information/data corresponding to the item. The identifying information/data can comprise information/data identifying the unique item identifier associated with the item. Accordingly, upon providing the identifying information/data to the item detail database (can be embedded in distribution computing entity), the item detail database can query the stored item profiles to retrieve the item profile corresponding to the provided unique identifier.

Moreover, the item information/data can comprise shipping information/data for the item. For example, the shipping information/data can identify an origin location (e.g., an origin serviceable point), a destination location (e.g., a destination serviceable point), a service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), whether a delivery confirmation signature is desired, requested, or required, and/or the like. In certain embodiments, at least a portion of the shipping information/data can be utilized as identifying information/data to identify an item. For example, a destination location can be utilized to query the item detail database to retrieve data about the item.

In certain embodiments, the item information/data comprises characteristic information/data identifying item characteristics. For example, the characteristic information/data can identify dimensions of the item (e.g., length, width, and height), a weight of the item, contents of the item, and/or the like. In certain embodiments, the contents of the item can comprise a precise listing of the contents of the item (e.g., three widgets) and/or the contents can identify whether the item contains any hazardous materials (e.g., the contents can indicate whether the item contains one or more of the following: no hazardous materials, toxic materials, flammable materials, pressurized materials, controlled substances, firearms, and/or the like).

5. Exemplary Item Information

As noted herein, various shipments/items can have an associated item profile, record, and/or similar words used herein interchangeably stored in an item detail database. The item profile can be utilized by the carrier to track the current location of the item and to store and retrieve information/data about the item. For example, the item profile can comprise electronic data corresponding to the associated item, and can identify various shipping instructions for the item, various characteristics of the item, and/or the like. The item profile can comprise electronic data that identifies the type of item and/or specifies the class of the item. The item profile can comprise data that indicates one or more characteristics of the item, including SKU, height, width, depth, weight, size, dimensions, density, fragility, temperature sensitivity (e.g., item to be refrigerated for shipment), retail or wholesale value of the item, materials from which the item is constructed (e.g., wood, metal, glass, fabric, compositions), item category (e.g., clothing, books, movies, electronics, computers, office, home, garden, pet supplies, food and grocery, dining table, sofa, rug, mattress, jewelry, hardware, lumber, propane, steel, manufacturing materials or parts), and the like. The electronic data can be in a format readable by various computing entities, such as the manual vehicle 800, the mobile computing entities 804a-f, an autonomous vehicle control system, and/or the like. However, it should be understood that a computing entity configured for selectively retrieving electronic data within various item profiles can comprise a format conversion aspect configured to reformat requested data to be readable by a requesting computing entity.

In various embodiments, the item profile comprises identifying information/data corresponding to the item. The identifying information/data can comprise information/data identifying the unique item identifier associated with the item. Accordingly, upon providing the identifying information/data to the item detail database, the item detail database can query the stored item profiles to retrieve the item profile corresponding to the provided unique identifier.

Moreover, the item profiles can comprise shipping information/data for the item. For example, the shipping information/data can identify an origin location (e.g., an origin serviceable point), a destination location (e.g., a destination serviceable point), a service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), whether a delivery confirmation signature is desired, requested, or required, and/or the like. In certain embodiments, at least a portion of the shipping information/data can be utilized as identifying information/data to identify an item. For example, a destination location can be utilized to query the item detail database to retrieve data about the item.

In certain embodiments, the item profile comprises characteristic information/data identifying item characteristics. For example, the characteristic information/data can identify dimensions of the item (e.g., length, width, and/or height), a weight of the item, contents of the item, and/or the like. In certain embodiments, the contents of the item can comprise a precise listing of the contents of the item (e.g., three widgets) and/or the contents can identify whether the item contains any hazardous materials (e.g., the contents can indicate whether the item contains one or more of the following: no hazardous materials, toxic materials, flammable materials, pressurized materials, controlled substances, firearms, and/or the like).

6. Exemplary Item Profile

As noted herein, various shipments/items can have an associated item profile, record, and/or similar words used herein interchangeably stored in an item detail database. The item profile can be utilized by the carrier to track the current location of the item and to store and retrieve information/data about the parcel/item/shipment. For example, the item profile can comprise electronic data corresponding to the associated parcel/item/shipment, and can identify various shipping instructions for the parcel/item/shipment, various characteristics of the parcel/item/shipment, and/or the like. The electronic data can be in a format readable by various computing entities, such as a computing entity 802, a mobile computing entities 804a-f, an autonomous vehicle control system, and/or the like. However, it should be understood that a computing entity configured for selectively retrieving electronic data within various item profiles can comprise a format conversion aspect configured to reformat requested data to be readable by a requesting computing entity. In various embodiments, the item profile comprises identifying information/data corresponding to the parcel/item/shipment. The identifying information/data can comprise information/data identifying the unique item identifier associated with the parcel/item/shipment. Accordingly, upon providing the identifying information/data to the item detail database, the item detail database or other data store can query the stored item profiles to retrieve the item profile corresponding to the provided unique identifier. Moreover, the item profiles can comprise shipping information/data for the parcel/item/shipment. For example, the shipping information/data can identify an origin location (e.g., an origin serviceable point), a destination location (e.g., a destination serviceable point), a service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, High value CHC (critical health care) shipments, and/or the like), whether a delivery confirmation signature is desired, requested, or required, and/or the like. In certain embodiments, at least a portion of the shipping information/data can be utilized as identifying information/data to identify a parcel/item/shipment. For example, a destination location can be utilized to query the item detail database to retrieve data about the parcel/item/shipment. In certain embodiments, the item profile comprises characteristic information/data identifying item characteristics. For example, the characteristic information/data can identify dimensions of the item (e.g., length, width, and height), a weight of the parcel/item/shipment, contents of the parcel/item/shipment, and/or the like. In certain embodiments, the contents of the item can comprise a precise listing of the contents of the item (e.g., three widgets) and/or the contents can identify whether the item contains any hazardous materials (e.g., the contents can indicate whether the item contains one or more of the following: no hazardous materials, toxic materials, flammable materials, pressurized materials, controlled substances, firearms, and/or the like).

7. Exemplary Autonomous Vehicle

As utilized herein, an autonomous vehicle 810 can be configured for transporting one or more shipments. Although the autonomous vehicle(s) 810 are discussed herein as comprising unmanned aerial vehicles (UAVs), it should be understood that the autonomous vehicles can be ground-based in certain embodiments. FIG. 11 illustrates an example autonomous vehicle 810 that can be utilized in various embodiments. As shown in FIG. 11, the autonomous vehicle 810 is embodied as a UAV generally comprising a UAV chassis 1100 and a plurality of propulsion members 1102 extending outwardly from the UAV chassis 1100 (in certain embodiments, the propulsion members 1102 are surrounded by propeller guards 1104). The UAV chassis 1100 generally defines a body of the UAV, which the propulsion members 1102 (e.g., propellers having a plurality of blades configured for rotating within a propeller guard circumscribing the propellers) are configured to lift and guide during flight. According to various embodiments, the UAV chassis 1100 can be formed from any material of suitable strength and weight (including sustainable and reusable materials), including but not limited to composite materials, aluminum, titanium, polymers, and/or the like, and can be formed through any suitable process.

In the embodiment depicted in FIG. 11, the autonomous vehicle 810 is a hexacopter and includes six separate propulsion members 1102, each extending outwardly from the UAV chassis 1100. However, as will be appreciated from the description herein, the autonomous vehicle 810 can include any number of propulsion members 1102 suitable to provide lift and guide the autonomous vehicle 810 during flight. The propulsion members 1102 are configured to enable vertical locomotion (e.g., lift) and/or horizontal locomotion, as shown in the example embodiment of FIG. 11, as well as enabling roll, pitch, and yaw movements of the autonomous vehicle 810. Although not shown, it should be understood that the autonomous vehicle(s) 810 can comprise any of a variety of propulsion mechanisms, such as balloon-based lift mechanisms (e.g., enabling lighter-than-air transportation), wing-based lift mechanisms, turbine-based lift mechanisms, and/or the like.

In the illustrated embodiment, the propulsion members 1102 are electrically powered (e.g., by an electric motor that controls the speed at which the propellers rotate). However, the propulsion members 1102 can be powered by internal combustion engines (e.g., alcohol-fueled, oil-fueled, gasoline-fueled, and/or the like) driving an alternator, hydrogen fuel-cells, and/or the like.

Moreover, as shown in FIG. 11, the lower portion of the UAV chassis 1100 is configured to receive and engage a parcel carrier 1106 configured for selectively supporting an item to be delivered from a manual vehicle 800 to a delivery destination. The parcel carrier 1106 can define the lowest point of the autonomous vehicle 810 when secured relative to the UAV chassis 1100 of the autonomous vehicle 810, such that an item carried by the autonomous vehicle 810 can be positioned below the UAV chassis 1100 of the autonomous vehicle 810 during transit. In certain embodiments, the parcel carrier 1106 can comprise one or more parcel engagement arms 1108 configured to detachably secure relative to the autonomous vehicle 810. In such embodiments, the item can be suspended by the parcel engagement arms 1108 below the autonomous vehicle 810, such that it can be released from the autonomous vehicle 810 while the autonomous vehicle 810 hovers over a desired delivery destination. However, it should be understood that the parcel carrier 1106 can have any of a variety of configurations enabling the autonomous vehicle 810 to support an item during transit.

In certain embodiments, the parcel carrier 1106 can be detachably secured relative to the UAV chassis 1100, for example, such that alternative parcel carriers having items secured thereto can be alternatively connected relative to the UAV chassis 1100 for delivery. In certain embodiments, a UAV can be configured to deliver an item secured within a parcel carrier 1106, and return to a manual vehicle 800 where the parcel carrier 1106, now empty due to the delivery of the item that was previously secured therein, can be detached from the autonomous vehicle 810 and a separate, new parcel carrier (not shown) having a second item can be secured to the UAV chassis 1100.

As indicated hereinafter regarding FIG. 12, which illustrates an example manual vehicle 800 according to various embodiments, the autonomous vehicle 810 can be configured to selectively engage a portion of the manual vehicle 800 such that the manual vehicle 800 can transport the autonomous vehicle 810 and/or other similar autonomous vehicles. For example, the UAV chassis 1100 can be configured to engage one or more vehicle guide mechanisms secured relative to the manual vehicle 800 to detachably secure the autonomous vehicle 810 relative to the manual vehicle 800 when not delivering shipments/items. As discussed herein, the guide mechanism of a manual vehicle 800 can be configured to enable an autonomous vehicle 810 to autonomously take-off or depart from the manual vehicle 800 to initiate a delivery activity and/or to autonomously land or arrive at the manual vehicle 800 to conclude a delivery activity.

Moreover, the autonomous vehicle 810 additionally comprises an onboard control system embodied as one or more of the mobile computing entities 804a-f that include a plurality of sensing devices that assist in navigating the autonomous vehicle 810 during flight. For example, the control system is configured to control movement of the autonomous vehicle 810, navigation of the autonomous vehicle 810, obstacle avoidance, item delivery, and/or the like. Although not shown, the control system can additionally comprise one or more user interfaces, which can comprise an output mechanism and/or an input mechanism configured to receive user input. For example, the user interface can be configured to enable autonomous vehicle technicians to review diagnostic information/data relating to the autonomous vehicle 810, and/or a user of the autonomous vehicle 810 can utilize the user interface to input and/or review information/data indicative of a destination location for the autonomous vehicle 810.

The plurality of sensing devices are configured to detect objects around the autonomous vehicle 810 and provide feedback to an autonomous vehicle onboard control system to assist in guiding the autonomous vehicle 810 in the execution of various operations, such as take-off, flight navigation, and landing, as will be described in greater detail herein. In certain embodiments, the autonomous vehicle control system comprises a plurality of sensors including ground landing sensors, vehicle landing sensors, flight guidance sensors, and one or more imaging devices/cameras (e.g., that utilize object recognition algorithms to identify objects). The vehicle landing sensors can be positioned on a lower portion of the UAV chassis 1100 and assist in landing the autonomous vehicle 810 on a manual vehicle 800 as will be described in greater detail herein. The vehicle landing sensors can include one or more imaging devices/cameras (e.g., video imaging devices/cameras and/or still imaging devices/cameras) and one or more altitude sensors (e.g., Light Detection and Ranging (LIDAR) sensors, laser-based distance sensors, infrared distance sensors, ultrasonic distance sensors, optical sensors and/or the like). Being located on the lower portion of the UAV chassis 1100, the vehicle landing sensors are positioned below the propulsion members 1102 and have a line of sight with the manual delivery vehicle's UAV support mechanism when the autonomous vehicle 810 approaches the manual vehicle 800 during landing.

The autonomous vehicle's one or more imaging devices/cameras can also be positioned on the lower portion of the UAV chassis 1100, on propeller guards 1104, and/or the like. The one or more imaging devices/cameras can include video and/or still imaging devices/cameras, and can capture images and/or video of the flight of the autonomous vehicle 810 during a delivery process, and can assist in verifying or confirming delivery of an item to a destination, as will be described in greater detail herein. Being located on the lower portion of the UAV chassis 1100, the one or more imaging devices/cameras are positioned below the propulsion members 1102 and have an unobstructed line of sight to view the flight of the autonomous vehicle 810. Moreover, as discussed specifically in reference to the mobile computing entities 804a-f, the one or more imaging devices/cameras disposed on the UAV can be configured for capturing images of one or more items/shipments before picking up those items/shipments, after dropping off those items/shipments, during transit of the items/shipments, and/or the like.

In particular embodiments, the information/data collection device 814 can include, be associated with, or be in wired or wireless communication with one or more processors (various exemplary processors are described in greater detail below), one or more location-determining devices or one or more location sensors (e.g., Global Navigation Satellite System (GNSS) sensors), indoor location sensors, (e.g., Bluetooth sensors, Wi-Fi sensors, GPS sensors, beacon sensors, and/or the like), one or more real-time clocks, a J-Bus protocol architecture, one or more electronic control modules (ECM), one or more communication ports for receiving information/data from various sensors (e.g., via a CAN-bus), one or more communication ports for transmitting/sending information/data, one or more RFID tags/sensors, one or more power sources, one or more information/data radios for communication with a variety of communication networks, one or more memory modules, and one or more programmable logic controllers (PLC). It should be noted that many of these components can be located in the autonomous vehicle 810 but external to the information/data collection device 814.

In some embodiments, the one or more location sensors, modules, or similar words used herein interchangeably can be one of several components in wired or wireless communication with or available to the information/data collection device 814. Moreover, the one or more location sensors can be compatible with satellite 806, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like.

As discussed herein, triangulation and/or proximity-based location determinations can be used in connection with a device associated with a particular autonomous vehicle 810 and with various communication points (e.g., cellular towers, Wi-Fi access points, and/or the like) positioned at various locations throughout a geographic area to monitor the location of the manual vehicle 800 and/or its operator. The one or more location sensors can be used to receive latitude, longitude, altitude, heading or direction, geocode, course, position, time, location identifying information/data, and/or speed information/data (e.g., referred to herein as location information/data and further described herein below). The one or more location sensors can also communicate with the computing entity 802, the information/data collection device 814, mobile computing entities 804*a-f*, and/or similar computing entities.

In some embodiments, the ECM can be one of several components in communication with and/or available to the information/data collection device 814. The ECM, which can be a scalable and subservient device to the information/data collection device 814, can have information/data processing capability to decode and store analog and digital inputs received from, for example, vehicle systems and sensors. The ECM can further have information/data processing capability to collect and present location information/data to the J-Bus (which can allow transmission to the information/data collection device 814), and output location identifying information/data, for example, via a display and/or other output device (e.g., a speaker).

As indicated, a communication port can be one of several components available in the information/data collection device 814 (or be in or as a separate computing entity). Embodiments of the communication port can include an Infrared information/data Association (IrDA) communication port, an information/data radio, and/or a serial port. The communication port can receive instructions for the information/data collection device 814. These instructions can be specific to the manual vehicle 800 in which the information/data collection device 814 is installed, specific to the geographic area and/or serviceable point to which the manual vehicle 800 will be traveling, specific to the function the vehicle serves within a fleet, and/or the like. In particular embodiments, the information/data radio can be configured to communicate with a WWAN, WLAN, WPAN, or any combination thereof. For example, the information/data radio can communicate via various wireless protocols, such as 802.11, GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols (including BLE), wireless USB protocols, and/or any other wireless protocol. As yet other examples, the communication port can be configured to transmit and/or receive information/data transmissions via light-based communication protocols (e.g., utilizing specific light emission frequencies, wavelengths (e.g., visible light, infrared light, and/or the like), and/or the like to transmit data), via sound-based communication protocols (e.g., utilizing specific sound frequencies to transmit data), and/or the like.

8. Exemplary Manual Vehicle

As discussed herein, a manual vehicle 800 can be a user (e.g., human) operable delivery vehicle configured for transporting a vehicle operator, a plurality of items, and one or more autonomous vehicle(s) 810 along a delivery route. However, it should be understood that in certain embodiments, even though the term "manual vehicle" is used, this is simply to distinguish it in the description from the autonomous vehicle 810. Thus, the manual vehicle 800 can itself be autonomous or semi-autonomous. For example, the manual vehicle 800 is a self-driving vehicle in some embodiments such that no physical person or user is needed to operate the manual vehicle 800. In certain embodiments, an autonomous vehicle can be configured as an autonomous base vehicle configured to carry a plurality of items, one or more smaller, auxiliary autonomous vehicles (e.g., autonomous vehicle 810 described in detail herein), a human delivery personnel (e.g., who can complete various deliveries from the manual vehicle 800 to respective destination locations), and/or the like. For example, a manual vehicle 800 can be a manned or an unmanned tractor, truck, car, motorcycle, moped, Segway, bicycle, golf cart, hand truck, cart, trailer, tractor and trailer combination, van, flatbed truck, vehicle, drone, airplane, helicopter, boat, barge, and/or any other form of object for moving or transporting people, UAVs, and/or shipments/items (e.g., one or more packages, parcels, bags, containers, loads, crates, items banded together, vehicle parts, pallets, drums, the like, and/or similar words used herein interchangeably). In particular embodiments, each manual vehicle 800 can be associated with a unique vehicle identifier (such as a vehicle ID) that uniquely identifies the manual vehicle 800.

In various embodiments, the manual vehicle 800 comprises one or more autonomous vehicle support mechanisms, as shown in FIG. 12. The autonomous vehicle support mechanisms can be configured to enable the autonomous vehicle(s) 810 to launch and land at the manual vehicle 800 while completing autonomous deliveries. Moreover, although not shown, the interior of the manual vehicle 800 can comprise a cargo area configured for storing a plurality of items, a plurality of autonomous vehicles such as autonomous vehicle 810, a plurality of autonomous vehicle components, and/or the like.

Moreover, the manual vehicle 800 can comprise and/or be associated with one or more of the mobile computing entities 804*a-f*, devices, and/or similar words used herein interchangeably. The mobile computing entities 804*a-f* can comprise, for example, an information/data collection device 814 or other computing entities.

In particular embodiments, the information/data collection device 814 can include, be associated with, or be in wired or wireless communication with one or more processors (various exemplary processors are described in greater detail below), one or more location-determining devices or one or more location sensors (e.g., GNSS sensors), one or more telematics sensors, one or more real-time clocks, a J-Bus protocol architecture, one or more ECMs, one or more communication ports for receiving telematics information/data from various sensors (e.g., via a CAN-bus), one or more communication ports for transmitting/sending information/data, one or more RFID tags/sensors, one or more power sources, one or more information/data radios for communication with a variety of communication networks, one or more memory modules, and one or more programmable logic controllers (PLC). It should be noted that many of these components can be located in the manual vehicle 800 but external to the information/data collection device 814.

In particular embodiments, the one or more location sensors, modules, or similar words used herein interchangeably can be one of several components in wired or wireless communication with or available to the information/data collection device 814. Moreover, the one or more location sensors can be compatible with satellite 806, LEO satellite systems, DOD satellite systems, the European Union Galileo positioning systems, the Chinese Compass navigation systems, Indian Regional Navigational satellite systems, and/or the like, as discussed above in reference to the autonomous delivery vehicle. Alternatively, triangulation can be used in connection with a device associated with a particular vehicle and/or the vehicle's operator and with various communication points (e.g., cellular towers or Wi-Fi access points) positioned at various locations throughout a geographic area to monitor the location of the manual vehicle 800 and/or its operator. The one or more location sensors can be used to receive latitude, longitude, altitude, heading or direction, geocode, course, position, time, and/or speed information/data (e.g., referred to herein as telematics information/data and further described herein below). The one or more location sensors can also communicate with the computing entity 802, the information/data collection device 814, mobile computing entities 804*a-f*, and/or similar computing entities.

In particular embodiments, the ECM can be one of several components in communication with and/or available to the information/data collection device 814. The ECM, which can be a scalable and subservient device to the information/data collection device 814, can have information/data processing capability to decode and store analog and digital inputs from vehicle systems and sensors (e.g., location sensor). The ECM can further have information/data processing capability to collect and present collected information/data to the J-Bus (which can allow transmission to the information/data collection device 814).

As indicated, a communication port can be one of several components available in the information/data collection device 814 (or be in or as a separate computing entity). Embodiments of the communication port can include an IrDA communication port, an information/data radio, and/or a serial port. The communication port can receive instructions for the information/data collection device 814. These instructions can be specific to the manual vehicle 800 in which the information/data collection device 814 is installed, specific to the geographic area in which the manual vehicle 800 will be traveling, specific to the function the manual vehicle 800 serves within a fleet, and/or the like. In particular embodiments, the information/data radio can be configured to communicate with WWAN, WLAN, WPAN, or any combination thereof, as discussed in reference to the autonomous vehicle, above.

9. Exemplary Conveying Mechanism

As shipments/items are moved through a carrier's logistics network between corresponding origins and destinations, those shipments/items can pass through one or more carrier sort locations. Each carrier sort location can comprise one or more conveying mechanisms (e.g., conveyor belts, chutes, and/or the like), configured to move shipments/items between incoming locations (e.g., incoming vehicles) to corresponding outbound vehicles destined for later locations along a parcel/item/shipment's intended transportation path between the origin and destination.

FIG. 13 includes an illustration of a conveying mechanism 1300 according to particular embodiments of the present disclosure. As shown in FIG. 13 and FIG. 14, the conveying mechanism 1300 can be used with an image capture system 1400 having multiple views and/or multiple fields-of-view (e.g., comprising many image acquisition devices) for acquiring information/data (including image information/data) regarding an item. As mentioned herein, each item can include an item identifier. Such item identifiers can be represented as text, barcodes, Aztec Codes, MaxiCodes, Data Matrices, Quick Response (QR) Codes, electronic representations, tags, character strings, and/or the like. The unique item identifier can be used by the carrier to identify and track the item as it moves through the carrier's transportation network. Further, such item identifiers can be affixed to items by, for example, using a sticker (e.g., label) with the unique item identifier printed thereon (in human and/or machine-readable form) or an RFID tag with the unique item identifier stored therein. Accordingly, the image acquisition devices 1402*a*, 1402*b*, 1402*c*, 1402*d*, and 1402*e* (i.e., 1402*a-e*) of FIG. 14 can be capable of acquiring data (including item identifiers) relevant to each parcel/item/shipment, including item identifier information/data, item condition information/data, and/or the like for shipments/items traveling along a corresponding conveying mechanism 1300 (e.g., conveyor belt, slide, chute, bottle conveyor, open or enclosed track conveyor, I-beam conveyor, cleated conveyor, and/or the like).

As indicated, the image acquisition devices 1402*a-e* can be part of an image capture system 1400 configured to capture images (e.g., image information/data) of shipments/items (and/or item identifiers) moving along the conveying mechanism 1300. Each of the image acquisition devices 1402*a-e* can have a corresponding fields-of-view 1404*a*, 1404*b*, 1404*c*, 1404*d*, and 1404*e* (i.e., 1404*a-e*), as shown in FIG. 14. There can be overlap between the fields-of-view 1404*a-e*, in some embodiments. For example, the image acquisition devices 1402*a-e* can include or be a video camera, camcorder, still camera, web camera, Single-Lens Reflex (SLR) camera, high-speed camera, and/or the like. In various embodiments, the image acquisition devices 1402*a-e* can be configured to record high-resolution image data and/or to capture image data at a high speed (e.g., utilizing a frame rate of at least 60 frames per second). Alternatively, the image acquisition devices 1402*a-e* can be configured to record low-resolution image data (e.g., images comprising less than 480 horizontal scan lines) and/or to capture image data at a low speed (e.g., utilizing a frame rate less than 60 frames per second). As will be understood by those skilled in the art, the image acquisition devices 1402*a-e* can be configured to operate with various combinations of the above features (e.g., capturing images with less than 480 horizontal scan lines and utilizing a frame rate of at least 60 frames per second, or capturing images with at least 480 horizontal scan lines and utilizing a frame rate less than 60 frames per second). In various embodiments, the image acquisition devices 1402*a-e* can be configured to capture image data of the shipments/items and conveying mechanism 1300 of sufficient quality that a user viewing the image data on the display can identify each item represented in the displayed image data. For example, in embodiments wherein the conveying mechanism 1300 and shipments/items are moving at a high rate of speed, the image acquisition devices 1402*a-e* can be configured to capture image data at a high speed. As will be recognized, the image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like. In certain embodiments, various features (e.g., text, objects of interest, codes, item identifiers, and/or the like) can be extracted from the image data.

As described in more detail with respect to FIG. 14 herein, in some embodiments, the image capture system 1400 can alternatively or additionally be located within various other points or areas within a parcel carrier's (e.g., parcel carrier 1106) logistic network other than the environment associated with FIG. 13.

The image capture system 1400 can additionally include or be one or more scanners, readers, interrogators, and similar words used herein interchangeably configured for capturing item indicia for each item (e.g., including item identifiers). For example, the image capture system 1400 can include one or more image acquisition devices 1402*a-e*, such as an optical reading device, a barcode scanner, an RFID reader, and/or the like configured to recognize and identify item identifiers associated with each parcel/item/shipment. In particular embodiments, the image acquisition devices 1402*a-e* can be capable of receiving visible light, infrared light, radio transmissions, and/or other transmissions capable of transmitting information to image acquisition devices 1402*a-e*. Similarly, image acquisition devices 1402*a-e* can include or be used in association with various lighting, such as light emitting diodes (LEDs), Infrared lights, array lights, strobe lights, and/or other lighting mechanisms to sufficiently illuminate the zones of interest to capture image data for analysis.

Similar to mobile computing entities 804*a-f* described above, in particular embodiments, the conveying mechanism 1300, the image capture system 1400, and/or the image acquisition devices 1402*a-e* individually can also include one or more communications interfaces for communicating with various computing entities, such as by communicating information/data, content, and/or similar terms used herein interchangeably that can be transmitted, received, operated on, processed, displayed, stored, and/or the like. Such communication can be executed using a wired data transmission protocol, such as FDDI, DSL, Ethernet, ATM, frame relay, DOCSIS, or any other wired transmission protocol. Similarly, the conveying mechanism 1300 can be configured to communicate via wireless external communication networks using any of a variety of protocols, as previously described hereinabove.

As will be understood by those skilled in the art, the image capture system 1400 can include any number of image acquisition devices 1402*a-e* as shown in FIG. 14. In various embodiments, one or more additional image acquisition devices can be used to capture additional image data at one or more additional locations along the conveying mechanism 1300 or an additional conveying mechanism. Such additional image acquisition devices can be located, for example, after the flow of items along the conveying mechanism 1300 is disturbed (e.g., the flow of items is culled, merged with an additional flow of items, or diverted to an additional conveying mechanism). Alternatively, one or more additional image acquisition devices can be located along the conveying mechanism 1300, such that the one or more additional image acquisition devices can capture updated image data after one or more of the items can have been removed from the conveying mechanism 1300. In various embodiments, the one or more additional image acquisition devices can include components substantially similar to the image capture system 1400. For example, the one or more additional image acquisition devices can include or be associated with one or more imaging devices and one or more scanners, readers, interrogators, and similar words used herein interchangeably, as described above in regards to the image capture system 1400. However, the one or more additional image acquisition devices can include fewer components than image acquisition devices 1402*a-e*.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A computer-implemented method comprising:
referencing an index having a plurality of classes, a plurality of tiers, and a plurality of ratios, each ratio corresponding to a particular combination of a class and a tier in the index;
for each instance of a plurality of instances encrypted in blocks of a distributed electronic ledger and received from an entity server in a predetermined period of time:
determining that the instance corresponds to one of the plurality of classes and one of the plurality of tiers in the index;
identifying at least one ratio that corresponds to a combination of the one class and the one tier to which the instance is determined to correspond;
determining a delivery value for the instance; and determining a contribution amount for the instance based on the corresponding at least one ratio identified;

determining a cumulative delivery value and a cumulative contribution amount of the plurality of instances for the predetermined period of time;

determining whether the cumulative contribution amount or the cumulative delivery value is greater; and automatically adjusting at least one of the plurality of ratios for a future predetermined period of time based on whether the cumulative contribution amount or the cumulative delivery value is greater.

2. The method of claim 1, wherein automatically adjusting the at least one of the plurality of ratios for the future predetermined period of time comprises increasing at least one ratio of the plurality of ratios and decreasing at least one other ratio of the plurality of ratios.

3. The method of claim 1, further comprising automatically adjusting at least a portion of the plurality of classes for the future predetermined period of time.

4. The method of claim 1, further comprising automatically adjusting at least a portion of the plurality of tiers for the future predetermined period of time.

5. The method of claim 1, wherein for each instance of another plurality of instances received from the entity server in the future predetermined period of time, identifying at least one adjusted ratio that corresponds to a combination of a particular class and a particular tier to which the instance is determined to correspond.

6. The method of claim 1, wherein each block electronically encodes and encrypts a corresponding instance, a value associated with the instance, and a timestamp associated with the instance.

7. The method of claim 6, wherein determining the contribution amount for the instance further comprises multiplying the value associated with the instance and the at least one ratio identified.

8. One more non-transitory computer-readable media having computer-executable instructions embodied thereon that, when executed, perform a method for evaluating and improving model version performance and accuracy, the media comprising instructions for:

referencing an index having a plurality of classes, a plurality of tiers, and a plurality of ratios, each ratio corresponding to a particular combination of a class and a tier in the index;

for each instance of a plurality of instances encrypted in blocks of a distributed electronic ledger and received from an entity server in a predetermined period of time:
  determining that the instance corresponds to one of the plurality of classes and one of the plurality of tiers in the index;
  identifying at least one ratio that corresponds to a combination of the one class and the one tier to which the instance is determined to correspond;
  determining a delivery value for the instance; and
  determining a contribution amount for the instance based on the corresponding at least one ratio identified;

determining a cumulative delivery value and a cumulative contribution amount of the plurality of instances for the predetermined period of time;

determining whether the cumulative contribution amount or the cumulative delivery value is greater; and automatically adjusting at least one of the plurality of ratios for a future predetermined period of time based on whether the cumulative contribution amount or the cumulative delivery value is greater.

9. The media of claim 8, wherein automatically adjusting the at least one of the plurality of ratios for the future predetermined period of time comprises increasing a portion of the plurality of ratios and decreasing another portion of the plurality of ratios.

10. The media of claim 8, further comprising instructions for automatically adjusting at least a portion of the plurality of tiers for the future predetermined period of time.

11. The media of claim 8, wherein the instance is determined to correspond to the one class of the plurality of classes based on a predicted cumulative delivery value associated with the entity server for the predetermined period of time.

12. The media of claim 8, wherein the instance is determined to correspond to the one tier of the plurality of tiers based on a value of the instance that is associated with a value range that correspond to the one tier.

13. The media of claim 8, wherein for each instance of another plurality of instances received from the entity server in the future predetermined period of time, the media comprise instructions for identifying at least one adjusted ratio that corresponds to a combination of a particular class and a particular tier to which the instance is determined to correspond.

14. The media of claim 8, wherein each block electronically encodes and encrypts a corresponding instance, a value associated with the instance, and a timestamp associated with the instance, and wherein determining the contribution amount for the instance further comprises multiplying the value associated with the instance and the at least one ratio identified.

15. The media of claim 8, wherein the delivery value for the instance is an estimate value determined using historical delivery data.

16. A system comprising:
one or more processors;
an instance assignment module that:
  references an index having a plurality of classes, a plurality of tiers, and a plurality of ratios, each ratio corresponding to a particular combination of a class and a tier in the index;
  for each instance of a plurality of instances encrypted in blocks of a distributed electronic ledger and received from an entity server in a predetermined period of time;
  determines that the instance corresponds to one of the plurality of classes and one of the plurality of tiers in the index;
  identifies at least one ratio that corresponds to a combination of the one class and the one tier to which the instance is determined to correspond;
  determines a delivery value for the instance; and
  determines a contribution amount for the instance based on the corresponding at least one ratio identified; and
a reconciliation module that:
  determines a cumulative delivery value and a cumulative contribution amount of the plurality of instances for the predetermined period of time;
  determines whether the cumulative contribution amount or the cumulative delivery value is greater; and
  automatically adjusts at least one of the plurality of ratios for a future predetermined period of time from the entity server based on whether the cumulative contribution amount or the cumulative delivery value is greater.

17. The system of claim 16, wherein the reconciliation module that automatically adjusts the at least one of the plurality of ratios for the future predetermined period of time further increases a portion of the plurality of ratios and decreases another portion of the plurality of ratios.

18. The system of claim 16, wherein the instance assignment module automatically adjusts the plurality of tiers for the future predetermined period of time.

19. The system of claim 16, wherein for each instance of another plurality of instances received from the entity server in the future predetermined period of time, at least one adjusted ratio is identified that corresponds to a combination of a particular class and a particular tier to which the instance is determined to correspond.

20. The system of claim 16, wherein each block electronically encodes and encrypts a corresponding instance, a value associated with the instance, and a timestamp associated with the instance, and wherein determining the contribution amount for the instance further comprises multiplying the value associated with the instance and the at least one ratio identified.

* * * * *